United States Patent [19]

Okuda et al.

[11] Patent Number: 5,321,616
[45] Date of Patent: Jun. 14, 1994

[54] VEHICLE CONTROL APPARATUS

[75] Inventors: Eiichiro Okuda, Habikino; Masuo Takigawa, Ikoma, both of Japan

[73] Assignee: Matsushita Electric Industrial Co., Ltd., Kadoma, Japan

[21] Appl. No.: 741,865

[22] Filed: Aug. 7, 1991

[30] Foreign Application Priority Data

Aug. 10, 1990 [JP] Japan ................................. 2-212860
Apr. 3, 1991 [JP] Japan ................................. 3-070959

[51] Int. Cl.$^5$ ........................ B62D 5/04; B60G 17/00
[52] U.S. Cl. ................................ 364/424.05; 280/707
[58] Field of Search ................... 280/707; 364/424.05, 364/424.01

[56] References Cited

U.S. PATENT DOCUMENTS

| | | | |
|---|---|---|---|
| 4,470,124 | 9/1984 | Tagami et al. | 364/571 |
| 4,730,839 | 3/1988 | Miyoshi | 280/91 |
| 4,767,588 | 8/1988 | Ito | 364/424 |
| 4,804,203 | 2/1989 | Glab et al. | 280/707 |
| 4,828,061 | 5/1989 | Kimbrough et al. | 180/79.1 |
| 4,828,283 | 5/1989 | Ishii et al. | 280/91 |
| 4,853,860 | 8/1989 | Achenbach | 364/424.05 |
| 4,909,535 | 3/1990 | Clark et al. | 280/707 |
| 4,947,327 | 8/1990 | Kawagoe | 364/424.05 |
| 4,989,148 | 1/1991 | Gurke et al. | 364/424.05 |
| 5,066,041 | 11/1991 | Kindermann et al. | 280/772 |
| 5,085,458 | 2/1992 | Kii et al. | 280/707 |
| 5,087,072 | 2/1992 | Kawarasaki | 280/772 |
| 5,130,926 | 7/1992 | Watanabe et al. | 364/424.05 |
| 5,142,475 | 8/1992 | Matsunaga et al. | 364/424.05 |

FOREIGN PATENT DOCUMENTS

| | | |
|---|---|---|
| 0366249 | 2/1990 | European Pat. Off. . |
| 0379143 | 7/1990 | European Pat. Off. . |
| 1277473 | 10/1989 | Japan . |
| 2100011 | 4/1990 | Japan . |
| 2100013 | 4/1990 | Japan . |
| 8900927 | 9/1989 | World Int. Prop. O. . |
| 9012698 | 1/1990 | World Int. Prop. O. . |

OTHER PUBLICATIONS

Patent Abstract of Japan, vol. 013, No. 212 (P-873) May 1989 re JP-A-10 29 707.
Patent Abstract of Japan, vol. 013, No. 209 (P-871) May 1989 re JP-A-10 26 161.

Primary Examiner—Thomas G. Black
Assistant Examiner—Susan Wieland
Attorney, Agent, or Firm—Cushman, Darby & Cushman

[57] ABSTRACT

A vehicle behavior during driving is correctly grasped by computing and map-retrieving from output signal ($\omega y$) of an angular velocity sensor (2) for detecting the angular velocity of the vehicle (11). A vehicle control apparatus of the present invention can correctly compensate the output signal ($\omega y$) having error owing to the secular change or temperature change, etc. by using a zero-point calculation means (6, 16, 26, 36, 46, 56) for calculating zero-point signal ($\omega y0$) and an angular velocity correction means (7, 17, 27, 37, 47, 57) for correcting the output signal ($\omega y$) of the angular velocity sensor (2).

8 Claims, 17 Drawing Sheets

VEHICLE CONTROL APPARATUS

FIELD OF THE INVENTION AND RELATED ART STATEMENT

1. Field of the Invention

The present invention relates to a vehicle control apparatus for controlling a vehicle posture by changing damping force of shockabsorber so as to obtain optimum driving stability and riding comfort, and by changing steering ratio of the rear wheels of the vehicle in relation with the front wheels in response to the driving state of the vehicle.

2. Description of the Related Art

When a vehicle passes over a big projection of an uneven road, the vehicle receives a great shock from the projection in a vertical direction of the vehicle. This great shock received by the vehicle is called a bottoming motion. When a vehicle is driving on an undulated road surface, the vehicle makes periodical motion in a vertical direction by resonance of the spring suspension. This periodical motion of the vehicle is called a bouncing motion. The inventors of the present invention have disclosed a suspension control apparatus for decreasing the bottoming motion and the bouncing motion in the Japanese patent applications No. Hei 2-100011 (Tokugan Hei 2-100011) and No. Hei 2-100013 (Tokugan Hei 2-100013). The suspension control apparatus which was disclosed by the inventors has a pitch angular velocity sensor for detecting the bottoming motion or the bouncing motion. Thus, the vehicle behavior is grasped and the damping force of the shockabsorbers are controlled in response to the vehicle behavior. As a result, the driving stability and riding comfort have been improved by the above-mentioned suspension control apparatus.

Furthermore, the Japanese patent application No. Hei 1-277473 (Tokugan Hei 1-277473) discloses another suspension control apparatus which was invented by the inventors of the present invention. This suspension control apparatus has a yaw angular velocity sensor for detecting the rolling motion of the vehicle during cornering or turning. Thus, the vehicle behavior during turning is monitored and the damping force of the shockabsorbers are controlled in response to the turning vehicle behavior.

A pitch angular velocity, which is detected by the above-mentioned pitch angular velocity sensor, is an angular velocity in a rotation about a lateral axis (pitch axis) of the vehicle. A yaw angular velocity, which is detected by the above-mentioned yaw angular velocity sensor, is an angular velocity in a rotation about vertical line (yaw axis) at a center of the vehicle.

FIG. 18 shows a characteristic diagram of the output signal of these angular velocity sensors. A line C in FIG. 18 shows a typical characteristic of an output signal of the angular velocity sensor for sensing angular velocity of the vehicle. As shown by the line C, when the angular velocity is "0", that is, the vehicle is moving on straight line or at a stop, the angular velocity sensor issues a zero-point signal $\omega y0$ to indicate the zero-point of the angular velocity. However, the zero-point signal $\omega y0$ issued while the vehicle is moving in a straight line moving or while the vehicle is stopped is liable to change owing to a secular change and/or temperature change, etc. For example, when the above-mentioned line C is drifted to a line D or E, the angular velocity sensor issues another zero-point signal $\omega y1$ or $\omega y2$ in spite of the fact that the vehicle is moving on the straight line or at the stop. As a result, the exact angular velocity of the vehicle can not be precisely detected by the conventional angular velocity sensor. As a result, the suspensions of the vehicle can not be correctly controlled in response to the vehicle posture.

OBJECT AND SUMMARY OF THE INVENTION

An object of the present invention is to provide a vehicle control apparatus which can accurately correct the drift value of the zero-point signal of the angular velocity sensor receiving the secular change and/or temperature change, etc., and which can appropriately control the suspensions of the rear wheels to control the vehicle posture.

In order to achieve the above-mentioned object, the vehicle control apparatus of the present invention comprises:

- a vehicle speed sensor for detecting speed of a vehicle;
- at least one angular velocity sensor for detecting angular velocity about a pitch axis, a yaw axis or a roll axis of the vehicle;
- a zero-point calculation means which detects a normal state of the vehicle by using output signals of the vehicle speed sensor and output signals of the angular velocity sensor, and which calculates a zero-point signal of the angular velocity sensor;
- an angular velocity correction means which corrects the output signal of the angular velocity sensor by using the zero-point signal calculated by the zero-point calculation means;
- a turning state inference means which infers a rolling state of the vehicle from corrected signal of the angular velocity correction means and the output signal of the vehicle speed sensor, and further produces output signals for controlling to decrease the rolling state; and
- shockabsorber means whereof damping force is adjusted in response to output signals from said turning state inference means.

In another embodiment of the present invention, the vehicle control apparatus of the present invention comprises:

- a vehicle speed sensor for detecting speed of a vehicle;
- a steering-wheel angle sensor for detecting steering angle of a steering wheel of the vehicle;
- an angular velocity sensor for detecting angular velocity about yaw axis of the vehicle;
- a rear-wheel steering-unit for steering rear wheels; and
- a four-wheel steering unit which comprises:
    (a) a zero-point calculation means for calculating a zero-point signal of the angular velocity sensor by using output signal of the angular velocity sensor;
    (b) an angular velocity correction means which corrects the output signal of the angular velocity sensor by the zero-point signal calculated by the zero-point calculation means; and
    (c) a rear-wheels decision means for deciding a target steer angle of the rear wheels in response to correction value corrected by the angular velocity correction means, output signals of the vehicle speed sensor and output signals of the steering wheel angle sensor.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

FIRST EMBODIMENT

Figure 1:
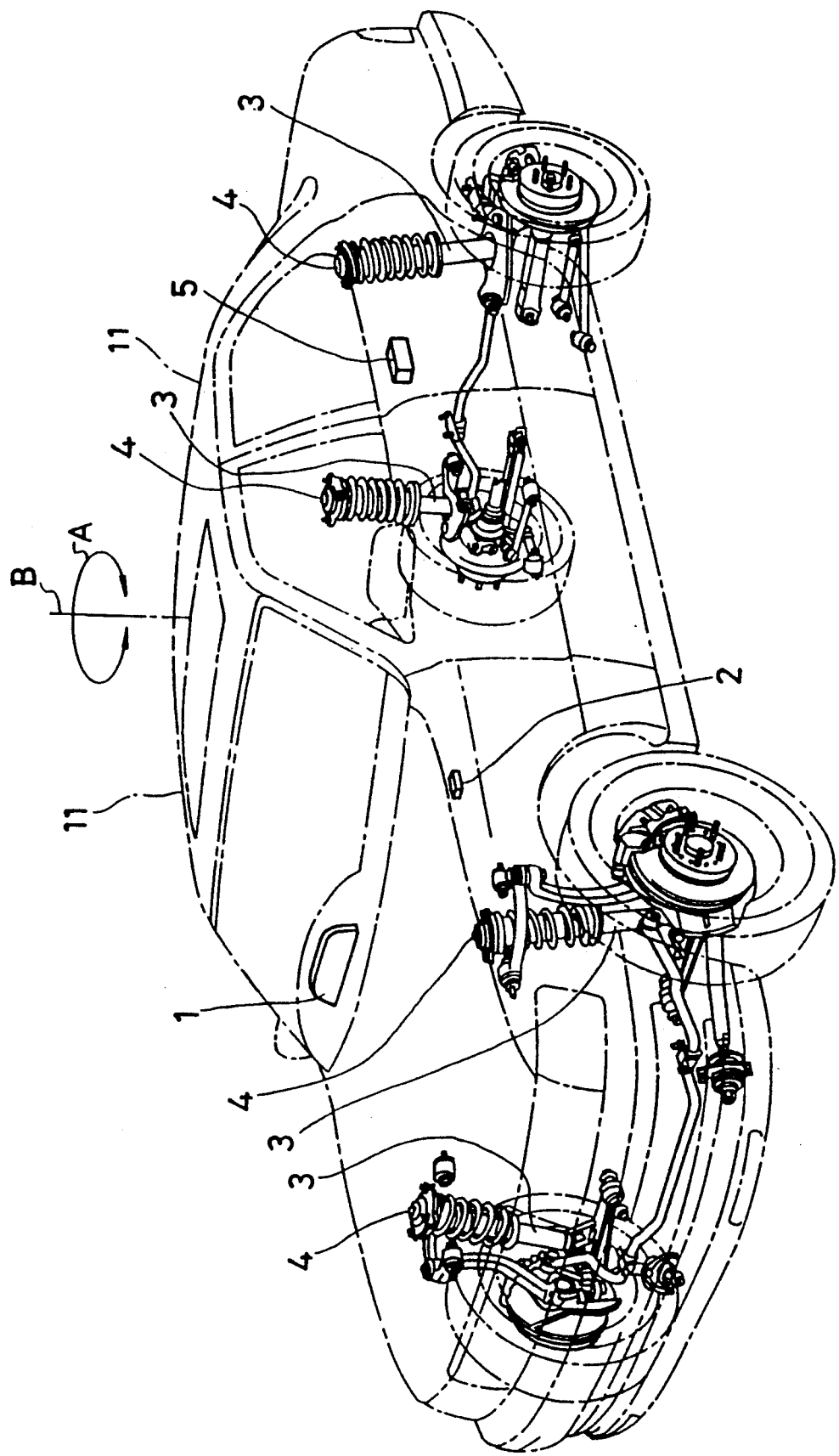
FIG. 1 is a perspective view showing the principal parts of a first embodiment of a vehicle control apparatus of the present invention in a vehicle shown with alternate long and short dash line.
Figure 2:
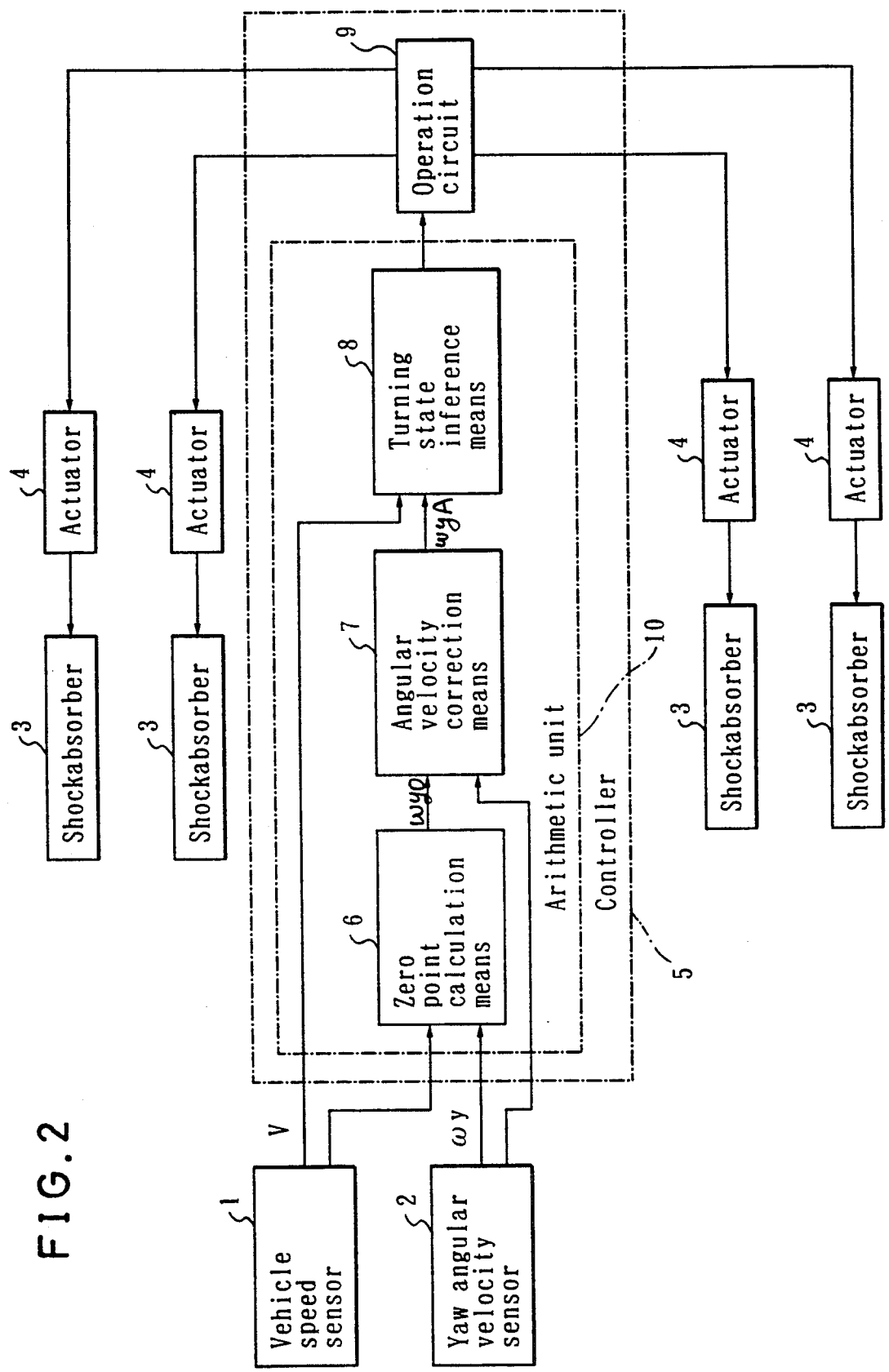
FIG. 2 is a block diagram of the vehicle control apparatus shown in FIG. 1.
Figure 3:
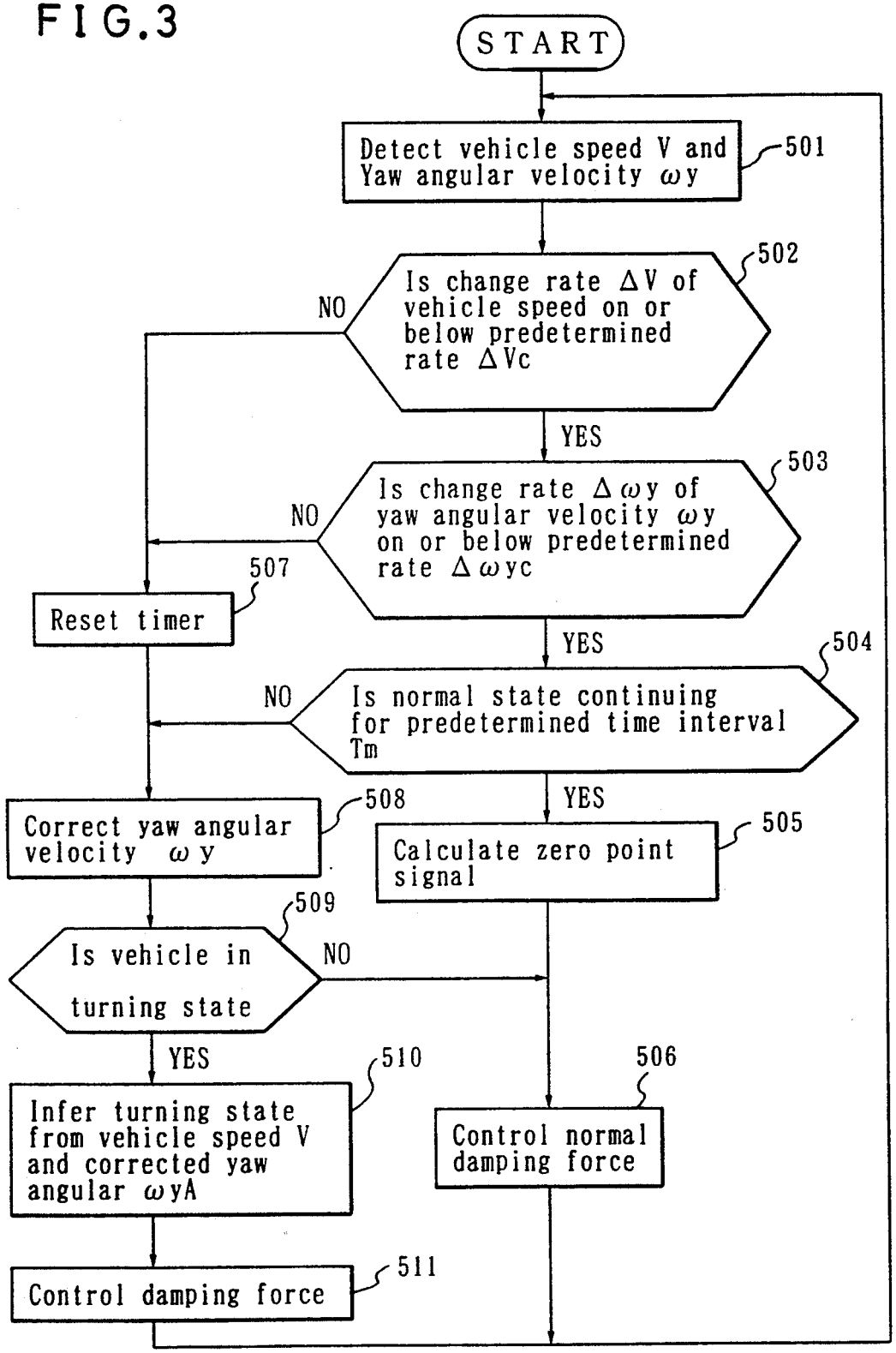
FIG. 3 is a flowchart of the operation of the first embodiment of the vehicle control apparatus.

Hereafter, a first embodiment of the vehicle control apparatus of the present invention is elucidated with reference to the accompanying drawings of FIGS. 1 through 3. A suspension control apparatus as the first embodiment of the vehicle control apparatus controls a rolling state of the vehicle during turning.

FIG. 1 is a perspective view showing a principal part of the suspension control apparatus which is disposed in a vehicle 11 shown with alternate long and short dash line. The suspension control apparatus comprises a vehicle speed sensor 1, a yaw angular velocity sensor 2, shockabsorbers 3, actuators 4 and a controller 5. The vehicle speed sensor 1, which is disposed in a front grill adjacent a speed meter, produces a signal corresponding to the vehicle speed by detecting the revolution speed of an output shaft of a gearbox in the vehicle 11. The yaw angular velocity sensor 2 is provided to detect an angular velocity of rotation about a vertical line at substantially center of the vehicle 11, that is about a yaw axis B of the vehicle 11. The direction of the rotation is shown with an arrow A In FIG. 1. The yaw angular velocity sensor 2, for instance described in U.S. Pat. No. 4,671,112 which is issued Jun. 9, 1987 and filed by the same assignee is usable for this purpose. The shockabsorbers 3 dampen the force received by wheels of the vehicle 11. The actuators 4, which are provided on the shockabsorbers 3, control the damping force of these shockabsorbers 3. The controller 5, which is disposed appropriate space, such as under the back seat or in the trunk, produces the output signal for controlling the damping force of the shockabsorber 3. The actuator 4 operates the shock absorber 3 by receiving a signal which is produced by the controller 5 in response to the output signals of the vehicle speed sensor 1 and the yaw angular velocity sensor 2.

FIG. 2 is a block diagram of the suspension control apparatus according to a first embodiment of the present invention. As shown in FIG. 2, the controller 5 is constituted by an arithmetic unit 10 and an operation circuit 9. The arithmetic unit 10 comprises a zero-point calculation means 6, an angular velocity correction means 7 and a turning state inference means 8. The zero-point calculation means 6 detects a straight line driving state on the flat surface of the road or a stopping state (thereafter, such state is abbreviated to normal state) by using output signals V of the vehicle speed sensor 1 and output signals $\omega y$ of the yaw angular velocity sensor 2. The zero-point calculation means 6 calculates a value of a zero-point signal $\omega y0$ of the yaw angular velocity sensor 2. In other words, the zero-point calculation means 6 regards an output signal of the yaw angular velocity sensor 2 as the zero-point signal $\omega y0$ when the vehicle 11 is in the normal state. The angular velocity correction means 7 calculates a deviation between the calculated zero-point signal $\omega y0$ and the detected output signal $\omega y$ of the yaw angular velocity sensor 2, and calculates a corrected value $\omega yA$ for the yaw angular velocity sensor 2. The turning state inference means 8 infers a rolling state of the turning vehicle 11 from the output signal V of the vehicle speed sensor 1 and the above-mentioned corrected value $\omega yA$ of the angular velocity correction means 7, and produces an output signal for controlling to decrease the rolling state. Table 1 below shows the map of operating parameters for the turning state inference means 8 wherein inferred rolling state caused by the turning vehicle is issued by retrieving the map by using output signal V of the vehicle speed sensor 1 and the corrected value $\omega yA$ of the yaw angular velocity sensor 2.

TABLE 1

| Yaw angular velocity | Vehicle Speed | | | | |
| --- | --- | --- | --- | --- | --- |
| | V0–V1 | V1–V2 | V2–V3 | V3–V4 | V4–V5 |
| $\omega yA1$–$\omega yA2$ | DUMP0 | DUMP1 | DUMP2 | DUMP3 | DUMP5 |
| $\omega yA2$– | DUMP0 | DUMP2 | DUMP4 | DUMP6 | DUMP7 |

TABLE 1-continued

| Yaw angular velocity | Vehicle Speed | | | | |
|---|---|---|---|---|---|
| | V0–V1 | V1–V2 | V2–V3 | V3–V4 | V4–V5 |
| ωyA3 | | | | | |
| ωyA3–ωyA4 | DUMP0 | DUMP3 | DUMP6 | DUMP8 | DUMP9 |
| ωyA4–ωyA5 | DUMP0 | DUMP5 | DUMP7 | DUMP9 | DUMP10 |

DUMP 0, DUMP 1, DUMP 2, - - - , DUMP 10 in Table 1 indicate different relative damping rates of the shockabsorber 3. DUMP 0 is usually the damping rate time the vehicle is normally driving (i.e. straight). The damping rate DUMP0 is given by the following equation (1):

$$DUMP0 = \frac{C}{2 \cdot \sqrt{M \cdot K}}, \qquad (1)$$

where C is the damping coefficient $$\left( \text{unit:} \frac{N \cdot \text{sec.}}{m} \right)$$

of the shockabsorber 3 during the time the vehicle is normally driving (i.e. straight), M is the spring mass $$\left( \text{unit:} \frac{N \cdot \text{sec.}^2}{m} \right),$$

and K is the spring constant $$\left( \text{unit:} \frac{N}{m} \right)$$

of the suspension.

DUMP 0, DUMP 1, DUMP 2, - - -, DUMP 10 are set up to satisfy the following inequality (2):

DUMP 0<DUMP 1<DUMP 2<DUMP 3<DUMP 4<DUMP 5<DUMP 6<DUMP 7<DUMP 8<DUMP 9<DUMP 10        (2).

Table 2 below shows the operating parameters which are found preferable through experiments.

TABLE 2

| Yaw angular velocity | Vehicle Speed | | | | |
|---|---|---|---|---|---|
| | 0(km/h) or more–below 20(km/h) | 20(km/h) or more–below 40(km/h) | 40(km/h) or more–below 60(km/h) | 60(km/h) or more–below 80(km/h) | 80(km/h) or more |
| 7(deg/sec) or more–below 10(deg/sec) | 0.20 | 0.25 | 0.30 | 0.35 | 0.45 |
| 10(deg/sec) or more–below 13(deg/sec) | 0.20 | 0.30 | 0.40 | 0.50 | 0.55 |
| 13(deg/sec) or more–below 16(deg/sec) | 0.20 | 0.35 | 0.50 | 0.60 | 0.65 |
| 16(deg/sec) or more | 0.20 | 0.45 | 0.55 | 0.65 | 0.70 |

As shown in FIG. 2, the operation circuit 9 which receives the output signal of the turning state inference means 8 produces signals for driving each actuator 4. The actuators 4 control the damping force of the shockabsorbers 3. The arithmetic unit 10, which includes the zero-point calculation means 6, the angular velocity correction means 7 and the turning state inference means 8, comprises an A/D converter and a logical circuit having a CPU, a ROM and a RAM.

Apart from the above-mentioned first embodiment wherein the rolling state of the vehicle 11 during the turning is inferred with the above-mentioned map, a modified embodiment may be such that the rolling state of the vehicle is inferred by computing the output signal V of the vehicle speed sensor 1 and the output signal ωy of the yaw angular velocity sensor 2.

FIG. 3 shows a flowchart in the arithmetic unit 10 of the controller 5 of the suspension control apparatus in accordance with the present invention.

In step 501 of FIG. 3, the output signal V from the vehicle speed sensor 1 and the output signal ωy from the yaw angular velocity sensor 2 are detected. Next, in step 502, it is judged whether an absolute value of a change rate ΔV of the vehicle speed V is on or below the predetermined change rate ΔVc, e.g. 0.1 km/h/sec.

In case where the absolute value of the change state rate ΔV is on or below the predetermined change rate ΔVc, that is when the below-mentioned inequality (3)

$$|\Delta V| \leq \Delta Vc \qquad (3)$$

is satisfied by the detected change rate ΔV, it is judged whether an absolute value of a change rate Δωy of the yaw angular velocity is on or below the predetermined change rate Δωyc, e.g. 0.3 deg/sec/sec.

In case where the absolute value of the yaw angular velocity is on or below the predetermined change rate Δωyc, that is when the below-mentioned inequality (4)

$$|\Delta \omega y| \leq \Delta \omega yc \qquad (4),$$

is satisfied by the detected change rate Δωy, the arithmetic unit 10 judges that the vehicle 11 is in the normal state.

When the arithmetic unit 10 judges "YES" in step 503, it is judged whether the normal state is continued for a predetermined time interval $T_m$, e.g. 5 sec. or not, in step 504. When the normal state is continued for the predetermined time interval $T_m$ or more, the arithmetic unit 10 judges that the yaw angular velocity of the vehicle 11 is substantially of a negligible value, e.g. substantially at a "zero-point" of the yaw angular velocity, and the sequence thereafter goes to step 505.

In step 505, the zero-point calculation means 6 calculates an average of the output signals ωy from the yaw angular velocity sensor 2, and the calculated average value is stored as a new value of the zero-point signal ωy0. The sequence thereafter goes to step 506 so as to keep the damping force of the shockabsorbers 3 at the usual damping rate.

In the above-mentioned steps 502 and 503, when the arithmetic unit 10 judges "NO", that is, the vehicle 11 is not in the normal state, the zero-point signal calculation routine has been finished and a timer for detecting a duration of the normal state is reset in step 507.

In step 508, the angular velocity correction means 7. corrects the detected output signal ωy of the yaw angular velocity sensor 2 by using the corrected value ωyA given by the following equation (5):

$$\omega yA = \omega y - \omega y0 \quad (5).$$

The corrected value ωyA of the yaw angular velocity is calculated by using the zero-point signal ωy0 stored in the arithmetic unit 10.

In step 509, it is judged, by using the corrected value ωyA calculated in step 508, whether the vehicle 11 is turning or not. When the arithmetic unit 10 judges "YES" in step 509, that is, the vehicle 11 is in a turning state, the sequence thereafter goes to step 510. In step 510, the turning state inference means 8 infers the rolling state during turning by retrieving the map (the aforementioned Table 1) with the output signal V of the vehicle speed sensor 1 and the corrected value ωyA of the yaw angular velocity sensor 2. As a result, the suspension control apparatus of the first embodiment controls on increase in the damping force of the shockabsorbers 3 in step 511.

On the contrary, when the arithmetic unit 10 in step 509 judges "NO", the damping force of the shockabsorbers 3 are kept at the ordinary damping rate during normal driving (straight) in step 506.

Thus, according to the first embodiment of the vehicle control apparatus of the present invention, the drift value of the detected zero-point signal owing to the secular change and/or the temperature change, etc. can be precisely corrected by the vehicle control apparatus, which comprises a zero-point calculation means for calculating a zero-point signal of an angular velocity sensor by using an average data of output signals of an angular velocity sensor, and an angular velocity correction means for calculating a deviation between the output signals detected by the angular velocity sensor and the calculated zero-point signal in the zero-point calculation means. As a result, the suspension of the vehicle can be correctly controlled by the vehicle control apparatus of the present invention.

SECOND EMBODIMENT

Figure 4:
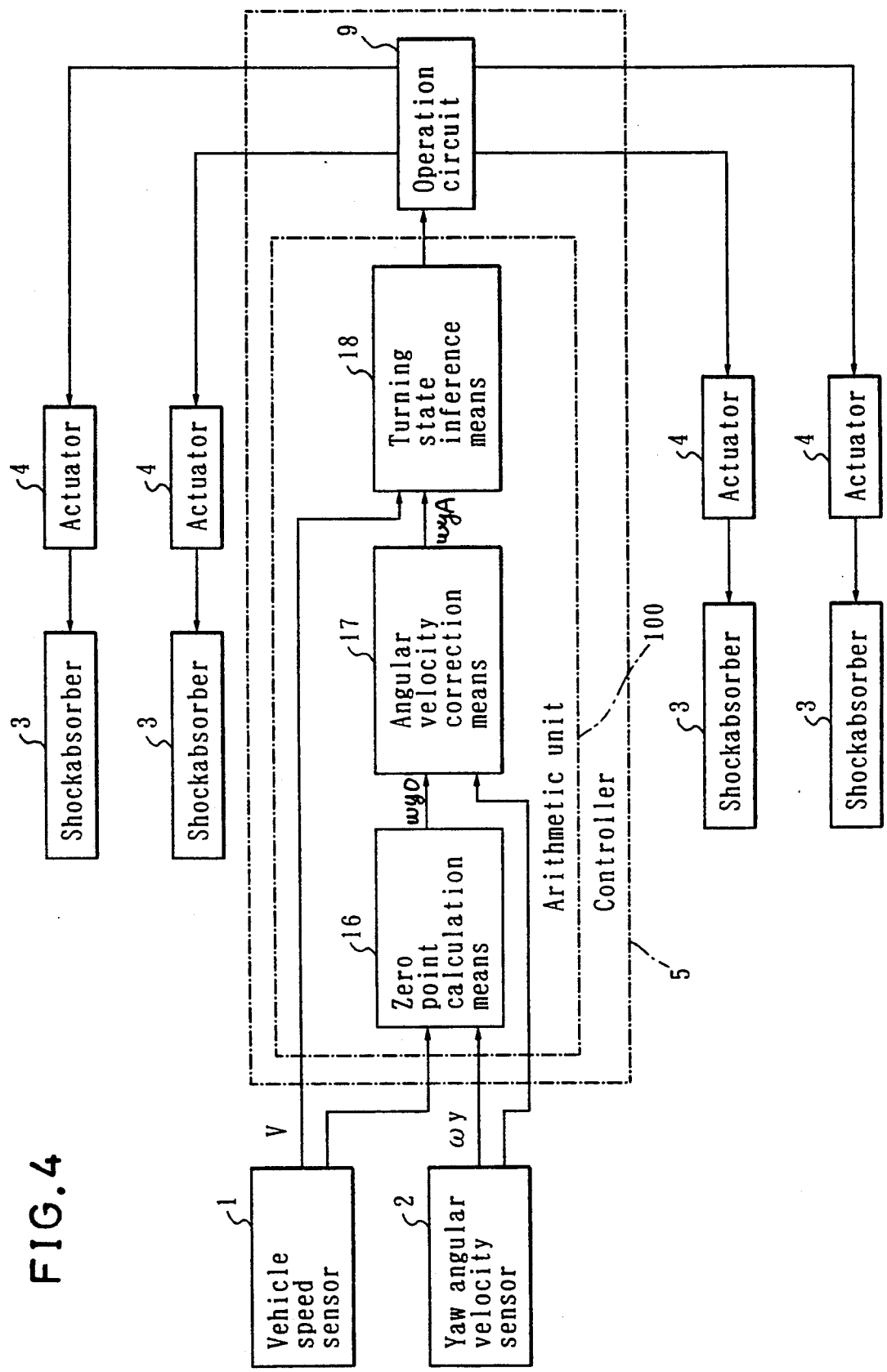
FIG. 4 is a block diagram of a second embodiment of the vehicle control apparatus of the present invention.
Figure 5:
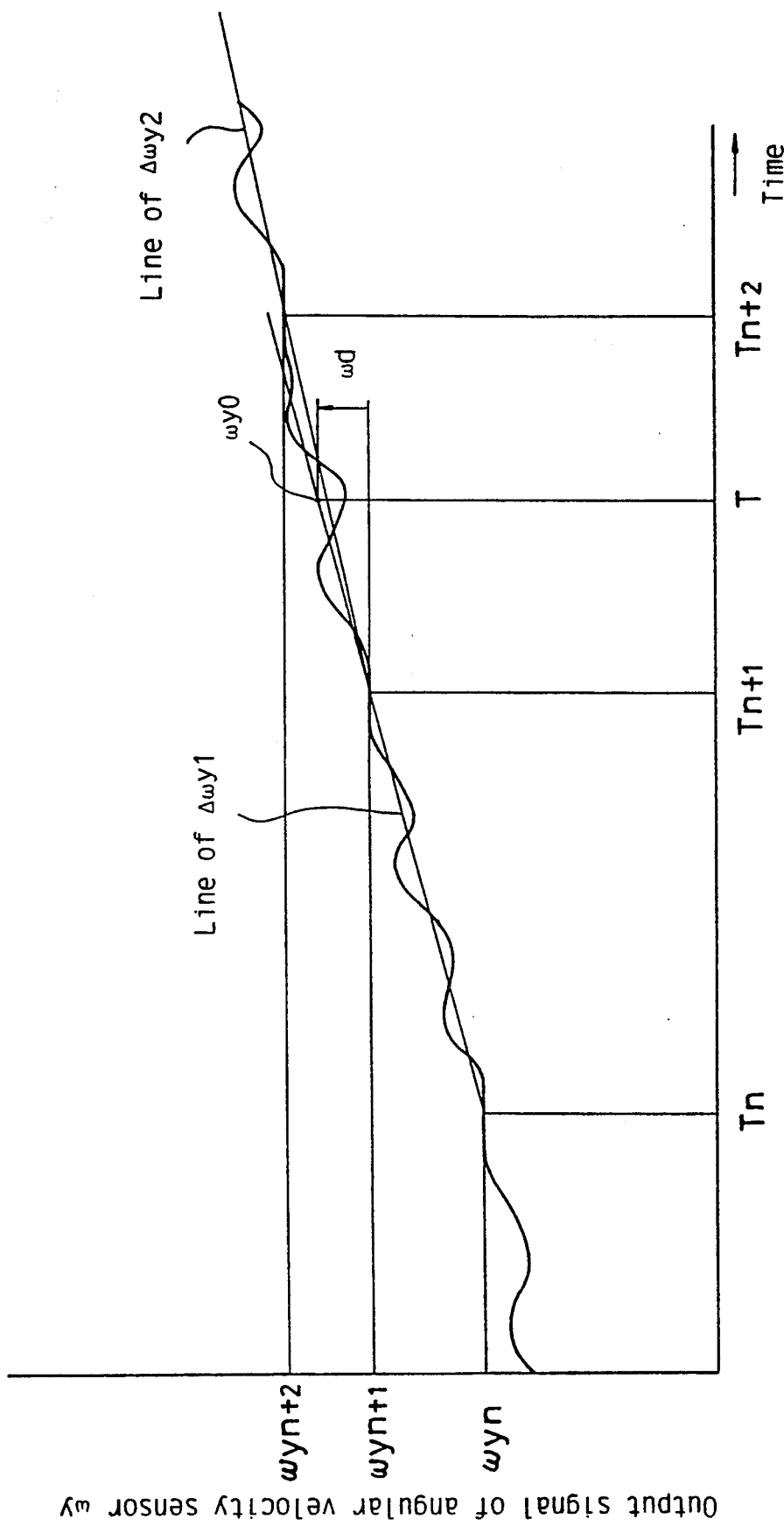
FIG. 5 is a characteristic diagram of the output signal of an angular velocity sensor of the vehicle control apparatus shown in FIG. 4.
Figure 6:
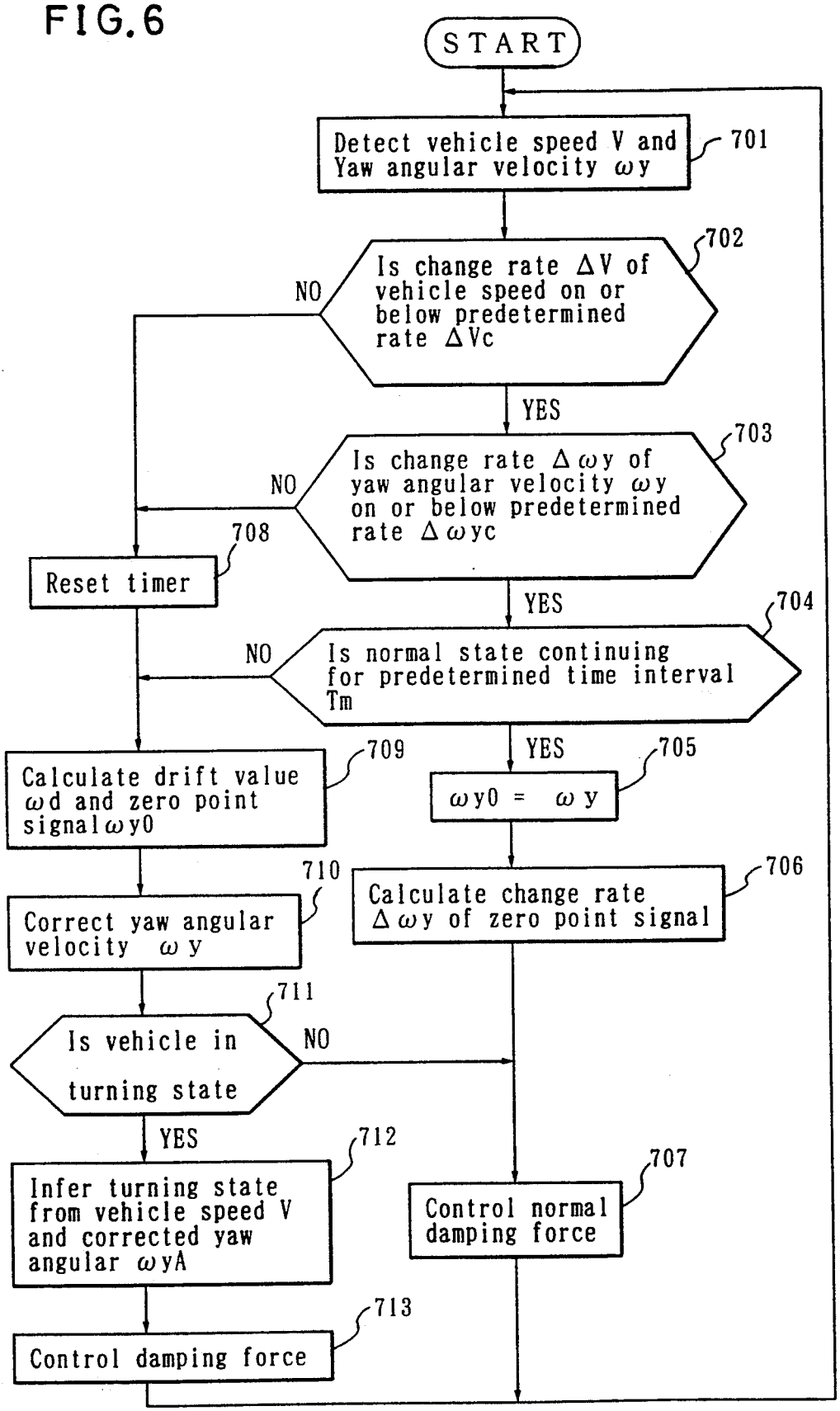
FIG. 6 is a flowchart of operation of the second embodiment of the vehicle control apparatus.

Hereafter, a second embodiment of the vehicle control apparatus of the present invention is elucidated with reference to the accompanying drawings of FIGS. 4 through 6. A suspension control apparatus as the second embodiment of the vehicle control apparatus also controls a rolling state of the vehicle during turning, using output signal corrected by means of a change rate of the zero-point signal, apart from using output signals in normal states in the first embodiment. Corresponding parts and components of the first embodiment are shown by the same numerals and marks, and the description thereon made in the first embodiment similarly apply. Differences and features of this second embodiment from the first embodiment are as follows.

FIG. 4 is a block diagram of the suspension control apparatus of the second embodiment. As shown in FIG. 4, the controller 5 of the second embodiment is constituted by an arithmetic unit 100 and an operation circuit 9. The arithmetic unit 100 comprises a zero-point calculation means 16, an angular velocity correction means 17 and a turning state inference means 18. The zero-point calculation means 16 detects a straight line driving state on the flat surface of the road or a stopping state (hereafter, such state is abbreviated to normal state) by using output signals V of a vehicle speed sensor 1 and output signals ωy of a yaw angular velocity sensor 2. The zero-point calculation means 16 calculates a change rate Δωy of value of a zero-point signal ωy0 of the yaw angular velocity sensor 2 (at the time T) and a drift value ωd of the zero-point signal ωy0 of the yaw angular velocity sensor 2. The angular velocity correction means 17 corrects the detected output signal ωy of the yaw angular velocity sensor 2, and calculates a corrected value ωyA for the yaw angular velocity sensor 2. The turning state inference means 18 infers a rolling state of the turning vehicle 11 from the output signal V of the vehicle speed sensor 1 and the corrected value ωyA of the angular velocity correction means 17, and thereby produces an output signal for controlling to decrease the rolling state by retrieving the map (the aforementioned Table 1 in the first embodiment).

The operation circuit 9 which receives the output signal of the turning state inference means 18 produces signals for driving each actuator 4. The actuators 4 control the damping force of the shockabsorbers 3.

FIG. 5 is a characteristic diagram of output signals from the yaw angular velocity sensor 2 in the suspension control apparatus of the second embodiment. FIG. 6 is a flowchart of operation of the second embodiment. In FIG. 5, when the vehicle 11 is in the normal state at the time indicated by a normal state time Tn, the yaw angular velocity sensor 2 issues an output signal ωyn. When the vehicle 11 is in the next normal state at the time indicated by a next normal state time Tn+1, the yaw angular velocity sensor 2 issue a drifted output signal ωyn+1 owing to the secular change and/or temperature change and so on. As shown in FIG. 5, the output signal ωy of the yaw angular velocity sensor 2 is drifting at a substantially constant change rate. Therefore, the change rate Δωy and a drift value ωd of the yaw angular velocity sensor 2 is calculated by the following equations in the zero-point calculation means 16.

The change rate Δωy1 of the zero-point signal ωy0 between the normal state time Tn and the next normal state time Tn+1 is given by the following equation (6):

$$\Delta\omega y1 = (\omega yn+1 - \omega yn)/(Tn+1-Tn) \quad (6),$$

and, the drift value ωd of the zero-point signal ωy0 at the present time T after the normal state time Tn+1 is given by the following equation (7):

$$\omega d = \Delta\omega y1 \times (T-Tn+1) \quad (7).$$

Therefore, a present zero-point signal ωy0 of the yaw angular sensor 2 is given by the following equation (8):

$$\omega y0 = \omega d + \omega yn+1 \quad (8).$$

When the vehicle 11 is in the next normal state at the time indicated by a normal state time Tn+2, the yaw angular velocity sensor 2 issues another output signal ωyn+2. The new change rate Δωy2 of the zero-point signal Δωy0 between the previous normal state time Tn+1 and the normal state time Tn+2 is calculated by the zero-point calculation means 16 in the same way as the aforementioned equation (6). Thereafter, a zero-point signal ωy0 and a drift value ωd after the normal state time Tn+2 are calculated by using the new change rate Δωy2 as aforementioned equations (7) and (8).

FIG. 6 show a flowchart of the arithmetic unit 100 of the controller 5 in the suspension control apparatus of the second embodiment in accordance with the present invention.

In step 701 of FIG. 6, the output signal V from the vehicle speed sensor 1 and the output signal ωy from the yaw angular velocity sensor 2 are detected. In step 702, it is judged whether a change rate ΔV of the vehicle speed V is on or below the predetermined change rate ΔVc (e.g. 0.1 km/h/sec). When the aforementioned formula (3) in the first embodiment is satisfied by the detected change rate ΔV, it is judged whether a change rate Δωy of the yaw angular velocity is on or below the predetermined change rate Δωyc (e.g. 0.3 deg/sec/sec) in step 703. When the aforementioned formula (4) is satisfied by the detected change rate Δωy, the arithmetic unit 100 Judges that the vehicle 11 is in the normal state.

When the arithmetic unit 100 judges "YES" in step 703, it is judged whether the normal state is continued for a predetermined time interval Tm (e.g. 5 sec.) or not in step 704. When the normal state is continued for the predetermined time interval Tm, the arithmetic unit 100 judges that the yaw angular velocity of the vehicle 11 is in the substantially nothing, namely, at a "zero-point" of the yaw angular velocity, the sequence thereafter goes to step 705.

In step 705, the detected output signal ωy of the yaw angular velocity sensor 2 is stored as a new zero-point signal (ωy0=ωy).

Next, in step 706, the zero-point calculation means 16 calculates the change rate Δωy of the yaw angular velocity by the aforementioned formula (6). The sequence thereafter goes to step 707 so as to keep the damping force of the shockabsorbers 3 at the usual damping rate.

In the above-mentioned step 702 or 703, when the arithmetic unit 100 judges "NO", that is, the vehicle 11 is not in the normal state, the zero-point signal calculation routine has been finished and a timer for detecting a duration of the normal state is reset in step 708, and the sequence goes to step 709.

When the arithmetic unit 100 judges "NO" in step 704, the drift value ωd and zero-point signal ωy0 are calculated by the formulas (7) and (8) in the zero-point calculation means 16 in step 709. The drift value ωd is calculated by using the change rate Δωy stored at the previous zero-point calculation routine.

In step 710, the detected output signal ωy of the yaw angular velocity sensor 2 is corrected to the corrected value ωyA by calculating the aforementioned formula (5) in the angular velocity correction means 17.

In step 711, it is judged by the corrected value ωyA calculated in step 710 whether the vehicle 11 is turning. When the arithmetic unit 100 judges "YES" in step 711, that is, the vehicle 11 is in turning state, the sequence thereafter goes to step 712. In step 712, the turning state inference means 18 infers the rolling state during turning by retrieving the map (the aforementioned Table 1) with the output signal V of the vehicle speed sensor 1 and the corrected value ωyA of the yaw angular velocity sensor 2. As a result, the suspension control apparatus of the second embodiment controls by increasing the damping force of the shockabsorbers 3 in step 713.

On the contrary, when the arithmetic unit 100 in step 711 judges "NO", the damping force of the shockabsorbers 3 are kept at the ordinary damping rate during normal driving (straight), in step 707.

Thus, according to the second embodiment of the vehicle control apparatus of the present invention, the deviation of the zero-point signal of the angular velocity sensor can be precisely calculated by the vehicle control apparatus which infers drift values of the zero-point signal during driving from the changing ratio of the zero-point signal which is detected during moving vehicle on straight line or at a stop. As a result, the suspensions of vehicles can be appropriately controlled in response to the vehicle driving state.

THIRD EMBODIMENT

Hereafter, a third embodiment of the vehicle control apparatus of the present invention is elucidated with reference to the accompanying drawings of FIG. 7 to 11. A suspension control apparatus as the third embodiment of the vehicle control apparatus also controls a rolling state of the vehicle during turning, using output signals of a low-pass filter of a zero-point calculation means 26, apart from using output signals corrected by means of change rate of zero-point signals. Corresponding parts and components to the first embodiment are shown by the same reference numerals and marks, and the description thereof made in the first embodiment similarly apply. Differences and features of this third embodiment from the first embodiment are as follows.

Figure 7:
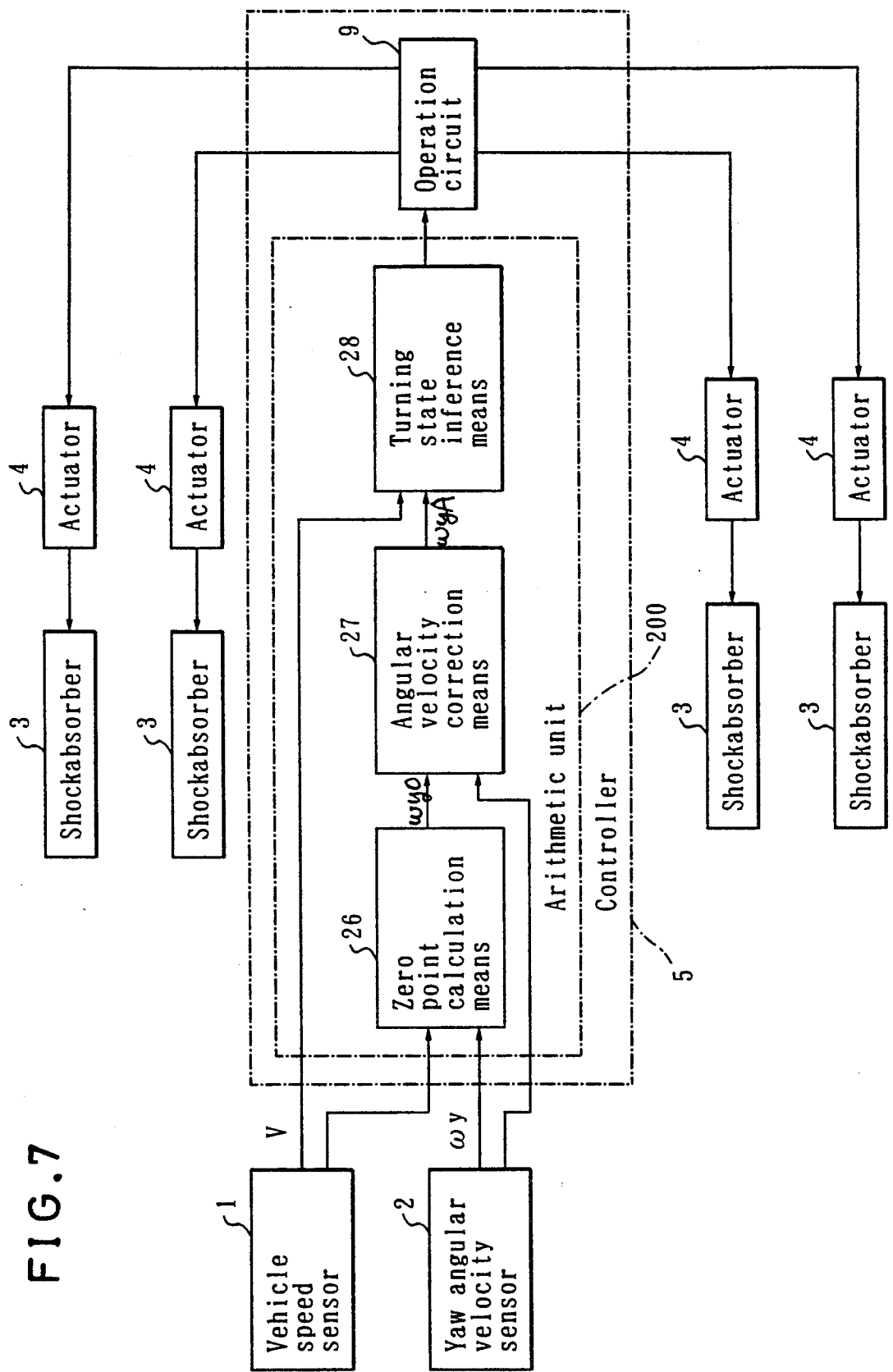
FIG. 7 is a block diagram of a third embodiment of the vehicle control apparatus of the present invention.

FIG. 7 is a block diagram of the suspension control apparatus of the third embodiment. As shown in FIG. 7, the controller 5 of the third embodiment is constituted by an arithmetic unit 200 and an operation circuit 9. The arithmetic unit 200 comprises a zero-point calculation means 26, an angular velocity correction means 27 and a turning state inference means 28. The zero-point calculation means 26, which comprises a low-pass digital filter, eliminates undesirable output signals for detecting change of the zero-point signal ωy0 of the yaw angular velocity sensor 2. The undesirable output signals of the yaw angular velocity sensor 2 are generated owing to the rolling and the vibrating of the vehicle 11. The zero-point calculation means 26 detects the drifted zero-point signal ωy0 owing to the secular change and/or the temperature change, etc. The angular velocity correction means 27 corrects the detected output signal ωy of the yaw angular velocity sensor 2, and calculates a corrected value ωyA of the yaw angular velocity sensor 2. The turning state inference means 28 infers a rolling state of the moving vehicle 11 from the output signal V of the vehicle speed sensor 1 and the corrected value ωyA of the angular velocity correction means 27, and thereby produces an output signal for controlling to decrease the rolling state by retrieving the map (the aforementioned table 1 in the first embodiment).

The operation circuit 9 which receives the output signal of the turning state inference means 28 produces signals for driving each actuator 4. The actuators 4 control the damping force of the shockabsorbers 3.

Figure 8:
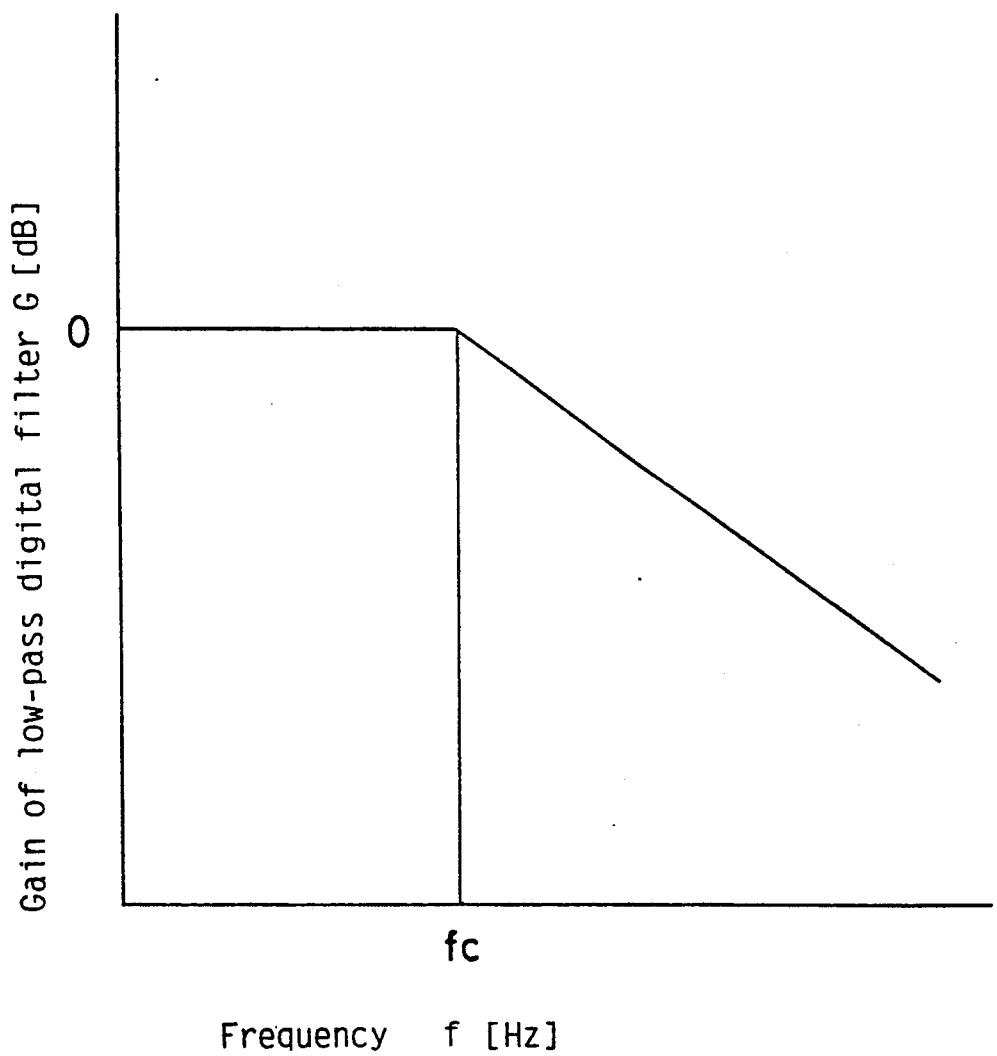
FIG. 8 is a characteristic diagram of a low-pass digital filter of the third embodiment of the vehicle control apparatus.

FIG. 8 shows typical gain characteristics of the low-pass digital filter of the zero-point calculation means 26 in the third embodiment. As shown in FIG. 8, the low-pass digital filter attenuates inputted signals having higher frequencies than the predetermined cut-off frequency, fc, or eliminate them. The function of the low-pass digital filter for calculating a zero-point signal ωy0(n) is shown by the following equation (9):

$$\omega y0(n) = A \cdot \omega y(n) + A \cdot \omega y(n-1) + B \cdot \omega y0(n-1) \qquad (9),$$

wherein A and B are constants decided by the low-pass digital filter, and given by the following equations:

$$A = T/(2\tau + T) \qquad (10),$$

$$B = (2\tau - T)/(2\tau + T), \quad (11)$$

$$\tau = 1/\pi \cdot fc, \quad (12)$$

and, T is a sampling period in the low-pass digital filter.

Apart from the above-mentioned embodiment wherein the low-pass digital filter having a simple equation shown by formula (9) is used in the zero-point calculation means 26, a modified embodiment may be such that a low-pass digital filter having quadratic equation or a low-pass analog filter is used in the zero-point calculation means 26.

Figure 9:
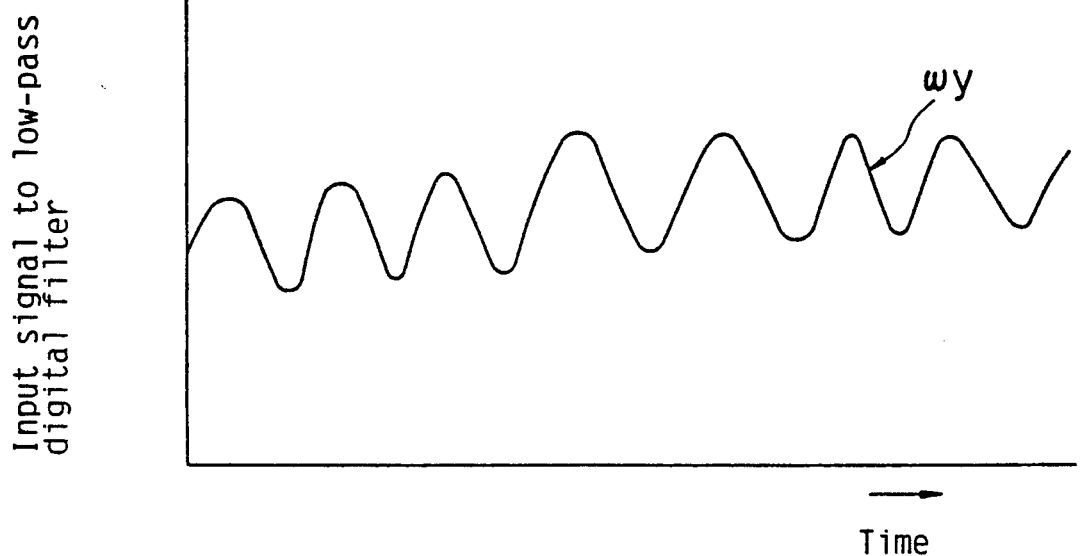
FIG. 9 is a waveform of an input signal of the low-pass digital filter of the third embodiment.
Figure 10:
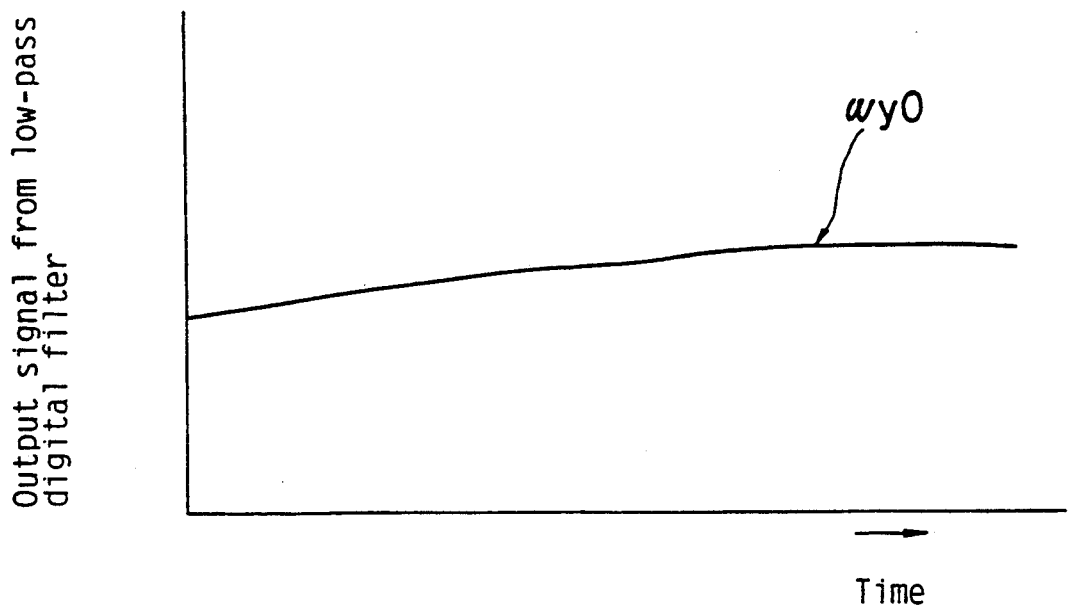
FIG. 10 is a waveform of an output signal of the low-pass digital filter of the third embodiment.

FIG. 9 shows a waveform of the input signal to the low-pass digital filter, and FIG. 10 shows a waveform of the output signal from the low-pass digital filter. Since the cutoff frequency fc, e.g. 10 mHz, is set at a frequency lower than the frequency of the above-mentioned undesirable signals owing to the rolling or the vibrating of the moving vehicle 11, the undesirable signals which are detected by the yaw angular velocity sensor 2 are eliminated by the low-pass digital filter. As a result, the change of the zero-point signal $\omega y0$ owing to the secular change and/or temperature change, etc. is distinctly shown in the output signal of the low-pass digital filter as shown by FIG. 10.

Figure 11:
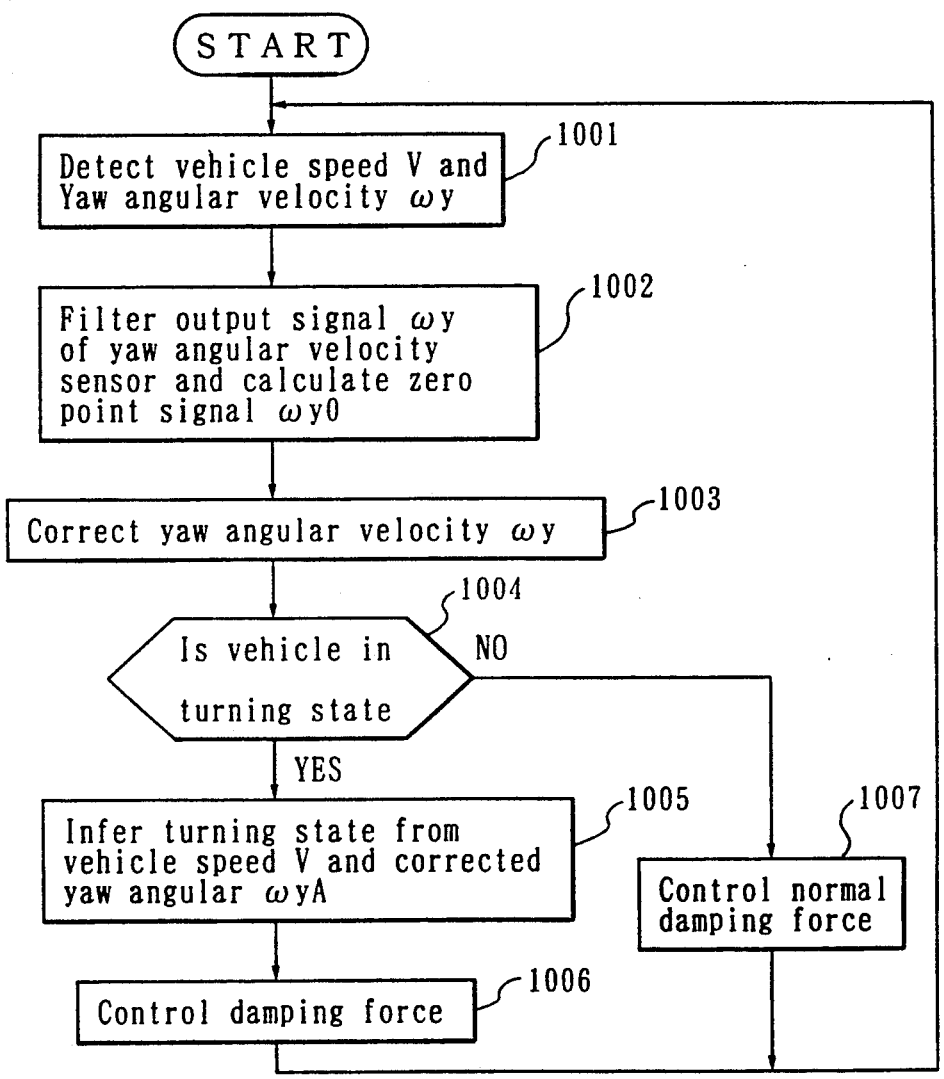
FIG. 11 is a flowchart of operation of the third embodiment of the vehicle control apparatus.

FIG. 11 shows a flowchart in the arithmetic unit 200 of the controller 5 in the suspension control apparatus of the third embodiment in accordance with the present invention.

In step 1001 of FIG. 11, the output signal V from the vehicle speed sensor 1 and the output signal $\omega y$ from the yaw angular velocity sensor 2 are detected. Next, in step 1002, the undesirable output signals of the yaw angular velocity sensor 2 owing to the rolling and the vibrating of the vehicle 11 are eliminated by the zero-point calculation means 26 which comprises the low-pass digital filter. The change of the zero-point signal $\omega y0$ is detected by calculating the aforementioned formula (9). The zero-point signal $\omega y0$ which is calculated by the zero-point calculation means 26 is stored in the arithmetic unit 200 as a new zero-point signal $\omega y0$ for correction.

In step 1003, the angular velocity correction means 27 corrects the detected output signal $\omega y$ of the yaw angular velocity sensor 2 to the corrected value $\omega yA$ by calculating the aforementioned formula (5) shown in the first embodiment.

In step 1004, it is judged by using the corrected value $\omega yA$ calculated in step 1003 whether the vehicle 11 is turning. When the arithmetic unit 200 judges "YES" in step 1004, that is, the vehicle 11 is in turning state, the sequence thereafter goes to step 1005. In step 1005, the turning state inference means 28 infers the rolling state during turning by retrieving the map (the aforementioned Table 1) with the output signal V of the vehicle speed sensor 1 and the corrected value $\omega yA$ of the yaw angular velocity sensor 2. As a result, the suspension control apparatus of the third embodiment controls by increasing the damping force of the shockabsorbers 3 in step 1006.

On the contrary, when the arithmetic unit 200 in step 1004 judges "NO", the damping force of the shockabsorbers 3 are kept at the usual damping rate when normally driving straight in step 1007.

Thus, according to the third embodiment of the vehicle control apparatus of the present invention, the drift value of the zero-point signal can be precisely detected in a driving state by a function of the vehicle control apparatus which removes the undesirable output signal of the angular velocity sensor in response to the rolling and vibrating of the driving vehicle, and calculates the drift value owing to the secular change and/or the temperature change, etc. As a result, the suspension of the vehicle can be appropriately controlled in response to the vehicle driving state.

Apart from the above-mentioned first, second and third embodiments wherein the damping force of the shockabsorbers 3 are controlled to decrease the rolling of the moving vehicle 11 by using the yaw-angular velocity detected by the yaw angular velocity sensor 2, a modified embodiment may be such that the damping force of the shockabsorbers 3 are controlled by using a pitch angular velocity, or by using a combined signal of two angular velocity signals in the yaw, roll and pitch angular velocity.

FOURTH EMBODIMENT

Figure 12:
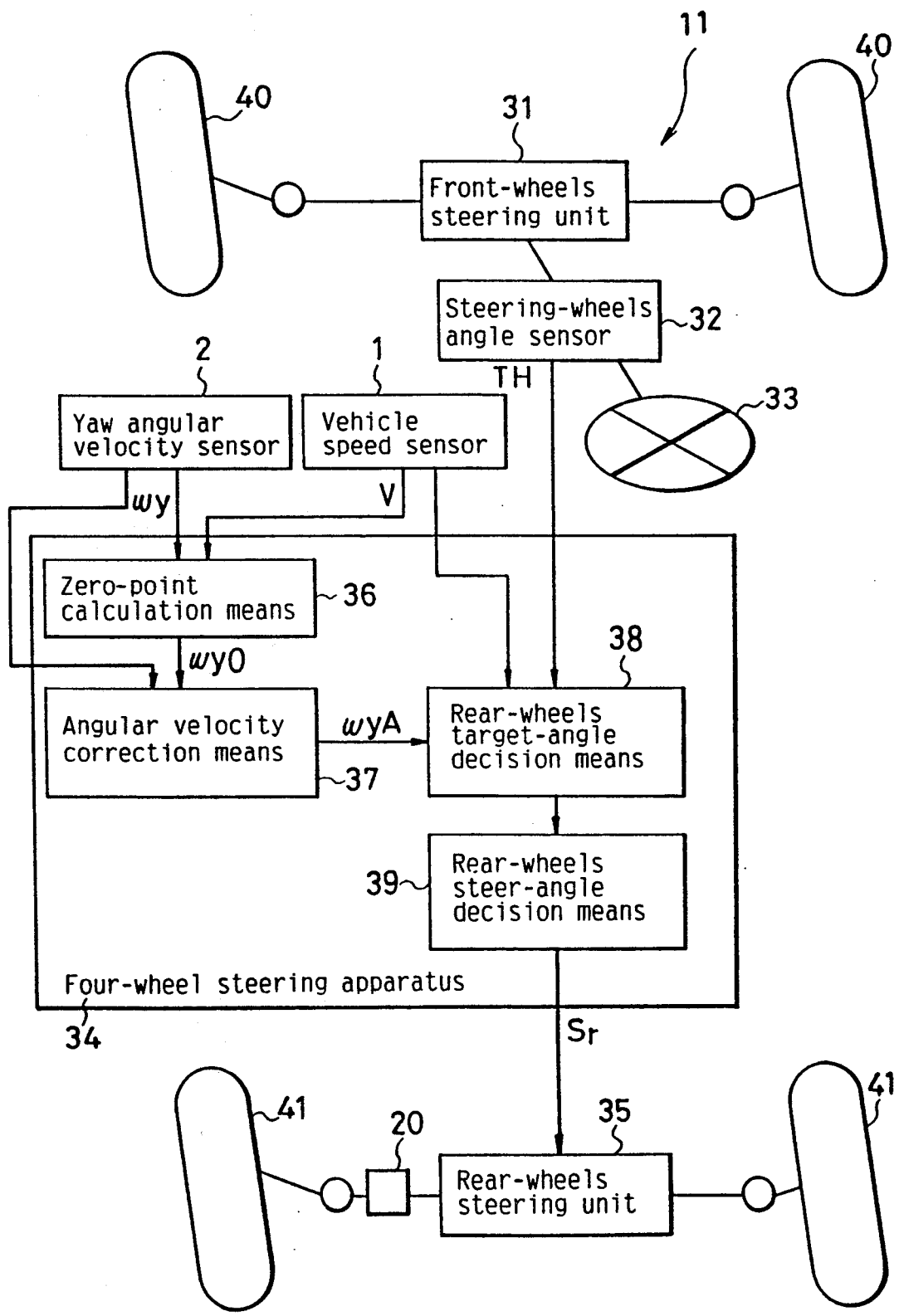
FIG. 12 is a schematic diagram of a fourth embodiment of the vehicle control apparatus of the present invention.
Figure 13:
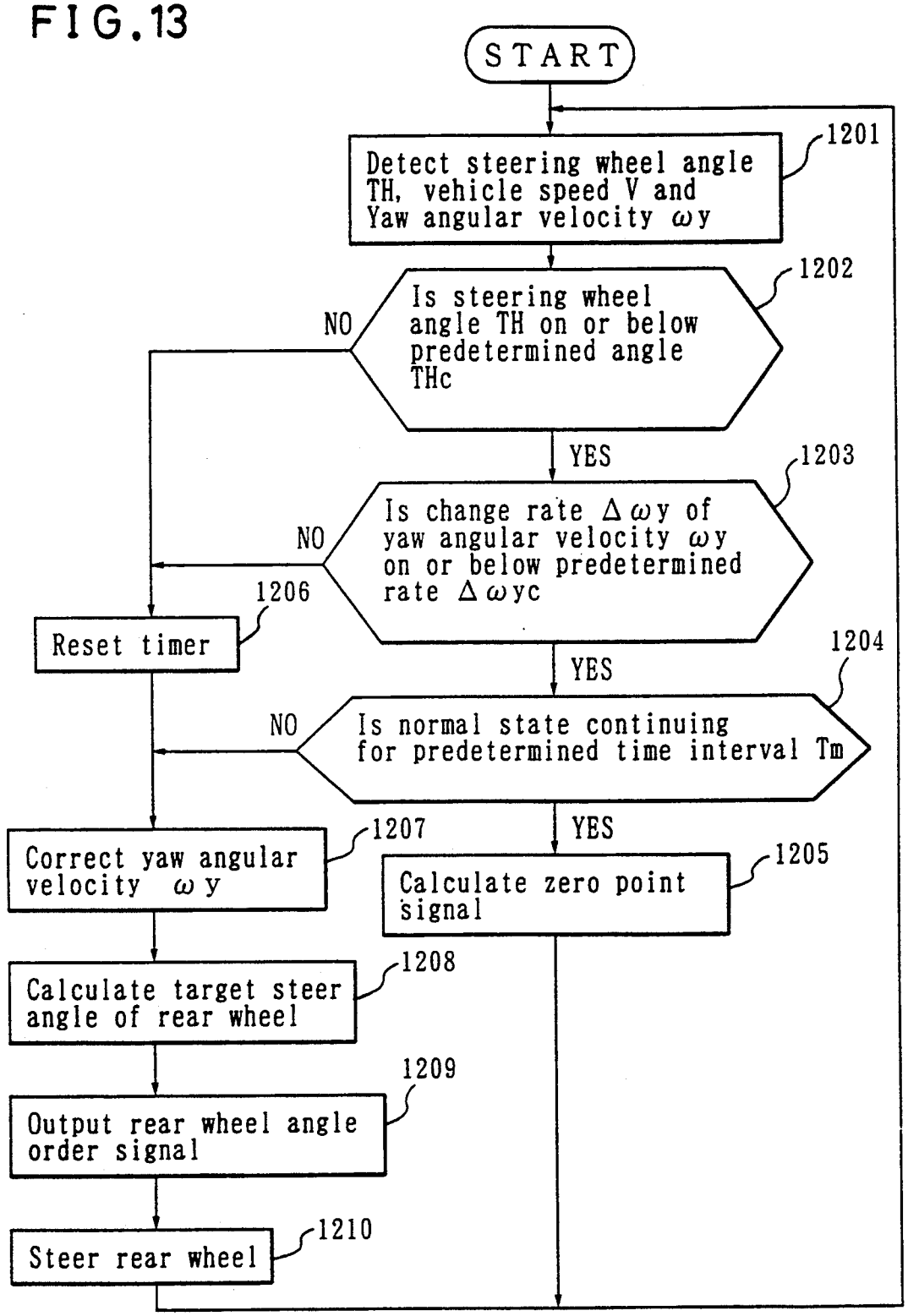
FIG. 13 is a flowchart of operation of the fourth embodiment of the vehicle control apparatus.

Hereafter, a four-wheel steering apparatus as a fourth embodiment of the vehicle control apparatus of the present invention is elucidated with reference to the accompanying drawings of FIGS. 12 and 13.

FIG. 12 shows a schematic diagram of the four-wheel steering apparatus according to a fourth embodiment of the vehicle control apparatus. FIG. 13 shows a flowchart of the operation of the fourth embodiment. As shown in FIG. 12, the four-wheel steering apparatus 34 receives detected signals $\omega y$ and V of the yaw angular velocity sensor 2 and vehicle speed sensor 1. The four-wheel steering apparatus 34 comprises a zero-point calculation means 36, an angular velocity correction means 37, a rear-wheels target-angle decision means 38 and a rear-wheels steer-angle decision means 39. The vehicle 11, which has the four-wheel steering apparatus 34, comprises: a front-wheels steering unit 31 for controlling a steering angle of front wheels 40 in response to the operation of a steering wheel 33; a rear-wheels steering unit 35 for controlling a steering angle for rear wheels 41; and a steering-wheel angle sensor 32 for detecting the steering angle of the steering wheel 33. The vehicle 11 further provides a rear-wheels steer-angle sensor 20 for detecting the steering angle of the rear wheels 41. The rear-wheels steering unit 35 controls the steering angle of the rear wheels 41 in response to a rear-wheels steer-angle command-signal Sr which is issued by the rear-wheels steer-angle decision means 39. The zero-point calculation means 36 of the four-wheel steering apparatus 34 calculates a zero-point signal $\omega y0$ for the yaw angular velocity sensor 2, by using the detected output signal $\omega y$ of the yaw angular velocity sensor 2 and the detected output signal V of the vehicle speed sensor 1 similarly to the aforementioned zero-point calculation means 6 in the first embodiment. In other words, when the zero-point calculation means 36 detects a normal state, that is, a straight line driving state or a stopping state, the zero-point calculation means 36 takes the detected output signal $\omega y$ as a zero-point signal $\omega y0$ for the yaw angular velocity sensor 2, by using the output signals $\omega y$ of the yaw angular velocity sensor 2 and the output signals V of the vehicle speed sensor 1. The angular velocity correction means 37 calculates a deviation between the calculated zero-point signal $\omega y0$ and the detected output signal $\omega y$ of the yaw angular velocity sensor 2, and calculates a corrected value $\omega yA$ for the yaw angular velocity sensor 2. The rear-wheels target-angle decision means 38 decides a target steer angle of the rear wheels 41, in response to the calculated corrected value ωyA, the steering-wheel angle-signal TH detected by the steering-wheel angle sensor 32 and the detected signal V of the vehicle speed sensor 1. The rear-wheels steer-angle decision means 39 issues the rear-wheels steer-angle command-signal Sr for controlling the steering angle of the rear wheels 41. The steering angle of the rear wheels 41 is detected by the rear-wheels steer-angle sensor 20 which issues feedback signals to the four-wheel steering apparatus 34.

FIG. 13 shows a flowchart of the four-wheel steering apparatus 34 in accordance with the present invention.

In step 1201 of FIG. 13, the output signal TH of the steering-wheel angle sensor 32, the output signal V of the vehicle speed sensor 1 and the output signal ωy of the yaw angular velocity sensor 2 are detected. Next, in step 1202, it is judged whether an absolute value of the detected steering-wheel angle-signal TH is on or below the predetermined value THc, e.g. 3 deg.

In cases where the detected TH value is below the predetermined value THc, that is when the detected steering-wheel angle-signal TH satisfies the following inequality (13):

$$|TH| \leq THc \qquad (13),$$

it is judged whether an absolute value of a change rate Δωy of the yaw angular velocity is on or below the predetermined change rate Δωyc, e.g. 0.3 deg/sec/sec, in step 1203.

In cases where the detected change rate Δωy is below the predetermined change rate Δωyc, that is when the detected change rate Δωy satisfies the following inequality (14):

$$|\Delta\omega y| \leq \Delta\omega yc \qquad (14),$$

the zero-point calculation means 36 of the four-wheel steering apparatus 34 judges that the vehicle 11 is in the aforementioned normal state, that is, the vehicle is in a straight line driving state or a stopping state.

When the zero-point calculation means 36 judges "YES" in step 1203, it is judged whether the normal state is continued for a predetermined time interval Tm, e.g. 5 sec, in step 1204. When the normal state is continued for the predetermined time interval Tm or more, the zero-point calculation means 36 judges that the yaw angular velocity of the vehicle 11 is substantially negligible, namely, substantially at a "zero-point" of the yaw angular velocity, and the sequence thereafter goes to step 1205.

In step 1205, the zero-point calculation means 36 calculates an average of the output signals ωy from the yaw angular velocity sensor 2, and the calculated average is stored as new value of the zero-point signal ωy0.

In the above-mentioned step 1202 or 1203, when the zero-point calculation means 36 judges "NO", that is, the vehicle 11 is not in the normal state, the zero-point signal calculation routine has been finished. A timer for detecting a duration of the normal state is reset in step 1206.

In step 1207, the angular velocity correction means 37 corrects the detected output signal ωy of the yaw angular velocity sensor 2 by using the corrected value ωyA which is given by the aforementioned formula (5) in the first embodiment. In other words, the detected output signal ωy of the yaw angular velocity sensor 2 is corrected by using the zero-point signal ωy0 which is calculated in the previous zero-point signal calculation routine.

In step 1208, the rear-wheels target-angle decision means 38 decides the target steer angle of the rear wheels 41 in response to the corrected value ωyA of the yaw angular velocity, the steering-wheels angle-signal TH detected by the steering-wheel angle sensor 32, and the detected signal V of the vehicle speed sensor 1. In step 1209, the rear-wheels steer-angle decision means 39 outputs the rear-wheels steer-angle command-signal Sr to the rear-wheels steering unit 35. The rear-wheels steering unit 35 steers the rear wheels 41 in response to the rear-wheels steer-angle command-signal Sr in step 1210.

Thus, according to the fourth embodiment of the present invention, the four-wheel steering apparatus can correctly compensate for the error of the yaw angular velocity sensor 2 which receives the secular change and the temperature change, etc.

FIFTH EMBODIMENT

Figure 14:
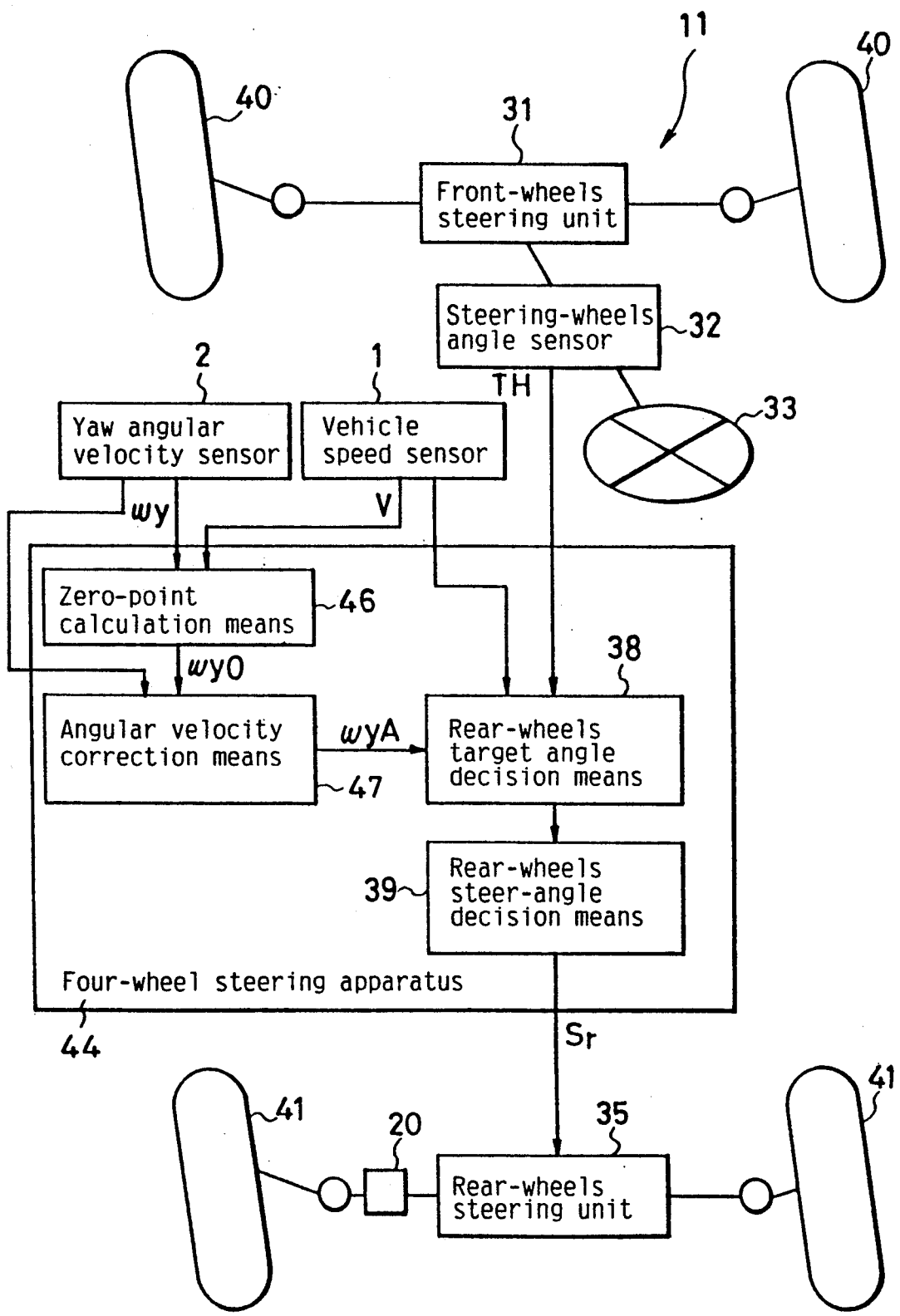
FIG. 14 is a schematic diagram of a fifth embodiment of the vehicle control apparatus of the present invention.
Figure 15:
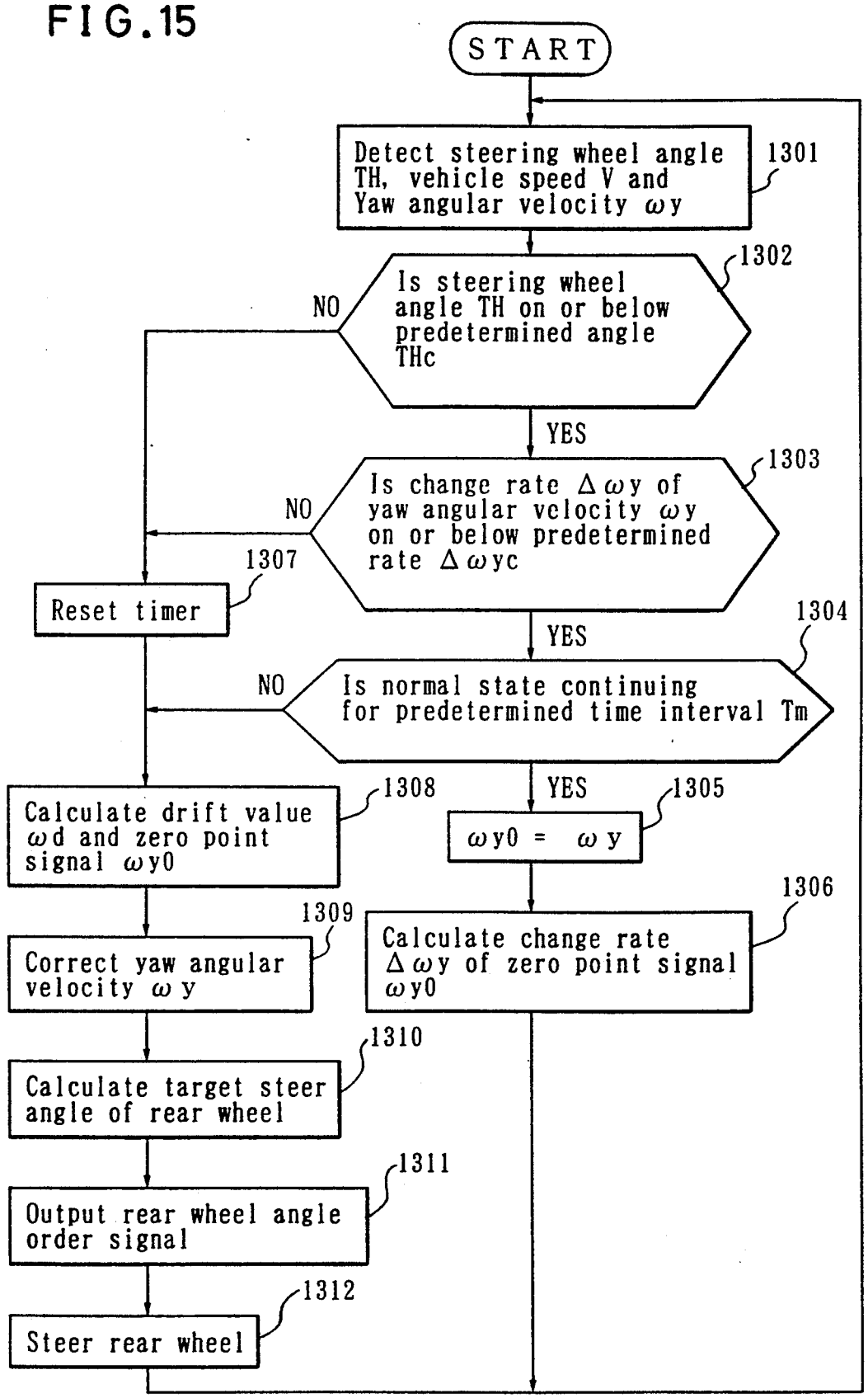
FIG. 15 is a flowchart of operation of the fifth embodiment of the vehicle control apparatus.

Hereafter, another four-wheel steering apparatus according to a fifth embodiment of the vehicle control apparatus of the present invention is elucidated with reference to the accompanying drawings of FIGS. 14 and 15.

FIG. 14 shows a schematic diagram of the four-wheel steering apparatus as the fifth embodiment of the vehicle control apparatus. FIG. 15 shows a flowchart of the operation for the fifth embodiment. Parts and components corresponding to the fourth embodiment are shown by the same reference numerals and marks, and the description thereof made in the fourth embodiment similarly apply. Differences and features of this fifth embodiment from the fourth embodiments are as follows.

As shown in FIG. 14, the four-wheel steering apparatus 44 receives detected signals V and ωy of the vehicle speed sensor 1 and the yaw angular velocity sensor 2. The four-wheel steering apparatus 44 comprises a zero-point calculation means 46, an angular velocity correction means 47, a rear-wheels target-angle decision means 38 and a rear-wheels steer-angle decision means 39. The vehicle 11 having the above-mentioned four-wheel steering apparatus 44 comprises: a front-wheels steering unit 31 for controlling a steering angle of front wheels 40 in response to the operation of a steering wheel 33; a rear-wheels steering unit 35 for controlling a steering angle of rear wheels 41; and a steering-wheel angle sensor 32 for detecting the steering angle of the steering wheel 33. The vehicle 11 further provides a rear wheel steer angle sensor 20 for detecting the steering angle of the rear wheels 41. The rear-wheels steering unit 35 controls the steering angle of the rear wheels 41 in response to a rear-wheels steer-angle command-signal Sr which is issued by the rear-wheels steer-angle decision means 39. The zero-point calculation means 46 of the four-wheel steering apparatus 44 calculates a zero-point signal ωy0 for the yaw angular velocity sensor 2 by using the detected output signal ωy of the yaw angular velocity sensor 2 and the detected output signal V of the vehicle speed sensor 1 similarly to the aforementioned zero-point calculation means 16 in the second embodiment. In other words, when the zero-point calculation means 46 detects a normal state, namely, a straight line driving state or a stopping state, the zero-point calculation means 46 calculates a change rate Δωy of value of a zero-point signal $\omega y0$, and a drift value $\omega d$ in the zero-point signal $\omega y0$ of the yaw angular velocity sensor 2, by using the output signal V of the vehicle speed sensor 1 and the output signal $\omega y$ of the yaw angular velocity sensor 2. The angular velocity correction means 47 corrects the detected output signal $\omega y$ of the yaw angular velocity sensor 2, and calculates a corrected value $\omega yA$ for the yaw angular velocity sensor 2. The rear-wheels target-angle decision means 38 decides a target steer angle of the rear wheels 41 in response to the calculated corrected value $\omega yA$, the steering-wheel angle-signal TH detected by the steering-wheel angle sensor 32 and the detected signal V of the vehicle speed sensor 1. The rear-wheels steer-angle decision means 39 issues the rear-wheels steer-angle command-signal Sr for controlling the steering angle of the rear wheels 41. The steering angle of the rear wheels 41 is detected by the rear-wheel steer-angle sensor 20 which issues feedback signals to the four-wheel steering apparatus 44.

FIG. 15 shows a flowchart of the four-wheel steering apparatus 44 in accordance with the present invention.

In step 1301 of the FIG. 15, the output signal TH of the steering-wheel angle sensor 32, the output signal V of the vehicle speed sensor 1 and the output signal $\omega y$ of the yaw angular velocity sensor 2 are detected. Next, in step 1302, it is judged whether an absolute value of the steering-wheel angle-signal TH is on or below the predetermined value THc, e.g. 3 deg.

In cases where the detected steering-wheel angle-signal TH is below the predetermined value THc, in other words, when the aforementioned formula (13) in the fourth embodiment is satisfied by the detected steering-wheel angle-signal TH, it is judged whether an absolute value of a change rate $\Delta\omega y$ of the yaw angular velocity is on or below the predetermined change rate $\Delta\omega yc$, e.g. 0.3 deg/sec/sec in step 1303.

In cases where the detected change rate $\Delta\omega y$ is below the predetermined change rate $\Delta\omega yc$, in other words, the aforementioned formula (14) in the fourth embodiment is satisfied by the detected change rate $\Delta\omega y$, the zero-point calculation means 46 of the four-wheel steering apparatus 44 judges that the vehicle 11 is in the aforementioned normal state, that is, the vehicle 11 is in a straight line driving state or a stopping state.

When the zero-point calculation means 46 judges "YES" in step 1303, it is judged whether the normal state is continued for a predetermined time interval Tm, e.g. 5 sec, in step 1304. When the normal state is continued for the predetermined time interval Tm or more, the zero-point calculation means 46 judges that the yaw angular velocity of the vehicle 11 is negligibly small, namely, at the "zero-point" of the yaw angular velocity, and the sequence thereafter goes to step 1305.

In step 1305, the detected output signal $\omega y$ of the yaw angular velocity sensor 2 is stored as new zero-point signal ($\omega y0 = \omega y$).

In step 1306, the zero-point calculation means 46 calculates the change rate $\Delta\omega y$ of the yaw angular velocity by the aforementioned formula (6) shown in the second embodiment.

In the above-mentioned step 1302 or 1303, when the zero-point calculation means 46 judges "NO", in other words, when the vehicle 11 is not in the normal state, the zero-point signal calculation routine has been finished and a timer for detecting a duration of the normal state is reset in step 1307.

When the zero-point calculation means 46 judges "NO" in step 1304, the drift value $\omega d$ and zero-point signal $\omega y0$ are calculated by the formulas (7) and (8) shown in the second embodiment. The drift value $\omega d$ is calculated by using the change rate $\Delta\omega y$ stored at the previous zero-point calculation routine in step 1306.

In step 1309, the detected output signal $\omega y$ of the yaw angular velocity sensor 2 is corrected to the corrected value $\omega yA$ by calculating the aforementioned formula (5) shown in the first embodiment.

In step 1310, the rear-wheels target-angle decision means 38 decides the target steer angle of the rear wheels 41, in response to the corrected value $\omega yA$ of the yaw angular velocity, the steering-wheels angle-signal TH detected by the steering-wheel angle sensor 32, and the detected signal V of the vehicle speed sensor 1. In step 1311, the rear-wheels steer-angle decision means 39 outputs the rear-wheels steer-angle command-signal Sr to the rear-wheels steering unit 35. The rear-wheels steering unit 35 steers the rear wheels 41 in response to the rear-wheels steer-angle command-signal Sr in step 1312.

Thus, according to the fifth embodiment of the present invention, the four-wheel steering apparatus can correctly compensate for the error of the yaw angular velocity sensor 2 which receives the secular change and the temperature change, etc.

SIXTH EMBODIMENT

Figure 16:
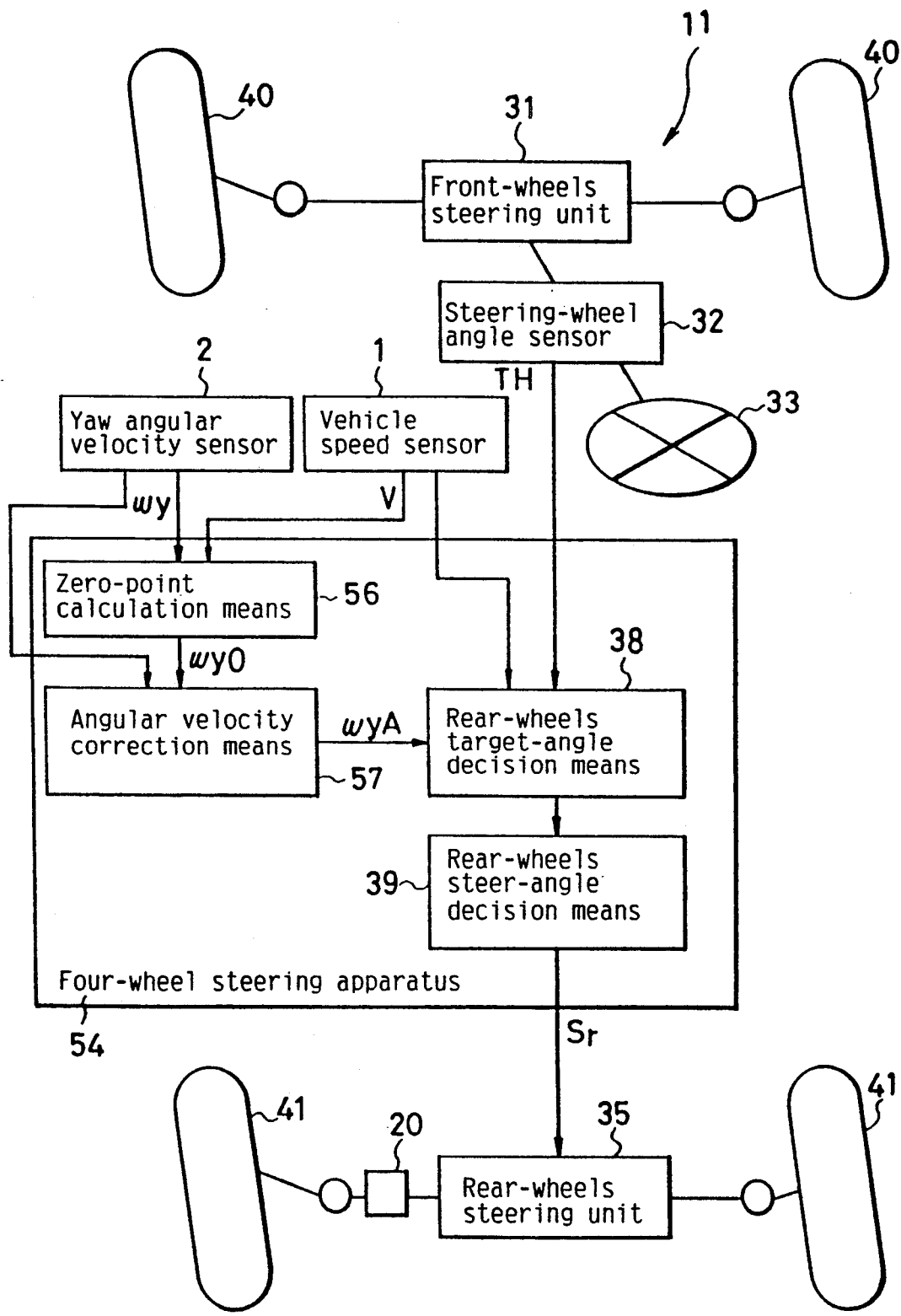
FIG. 16 is a schematic diagram of a sixth embodiment of the vehicle control apparatus of the present invention.
Figure 17:
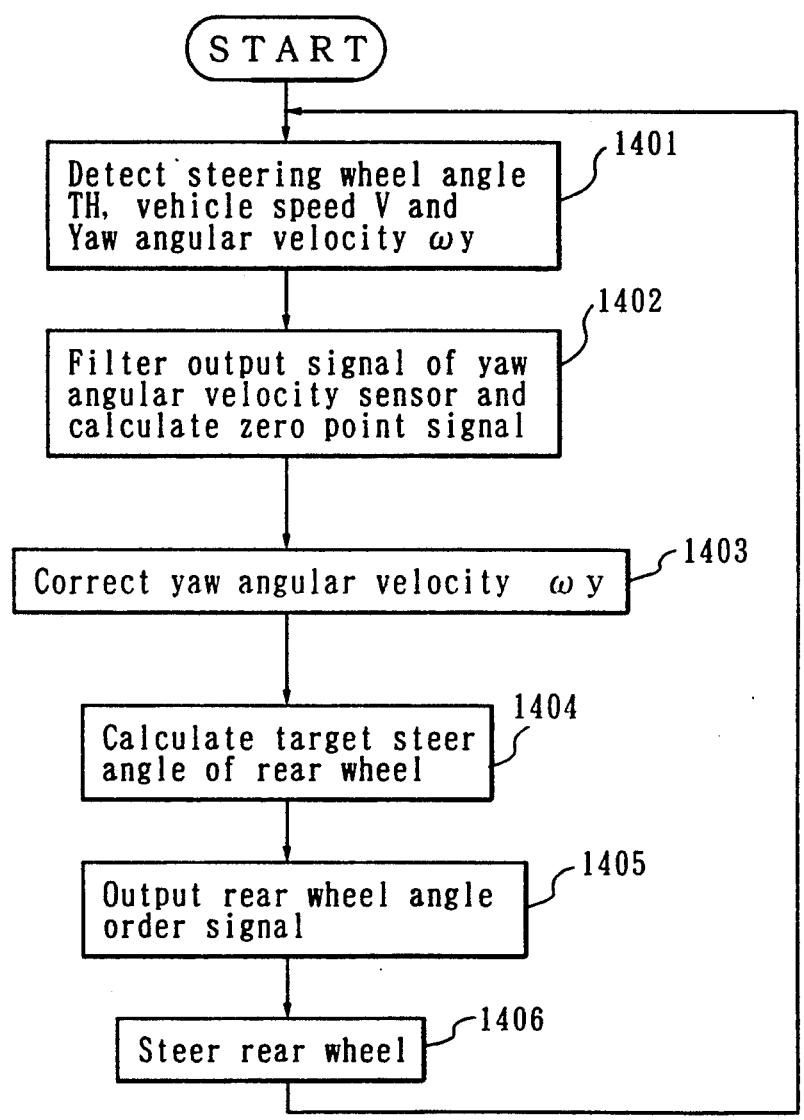
FIG. 17 is a flowchart of operation of the sixth embodiment of the present invention.
Figure 18:
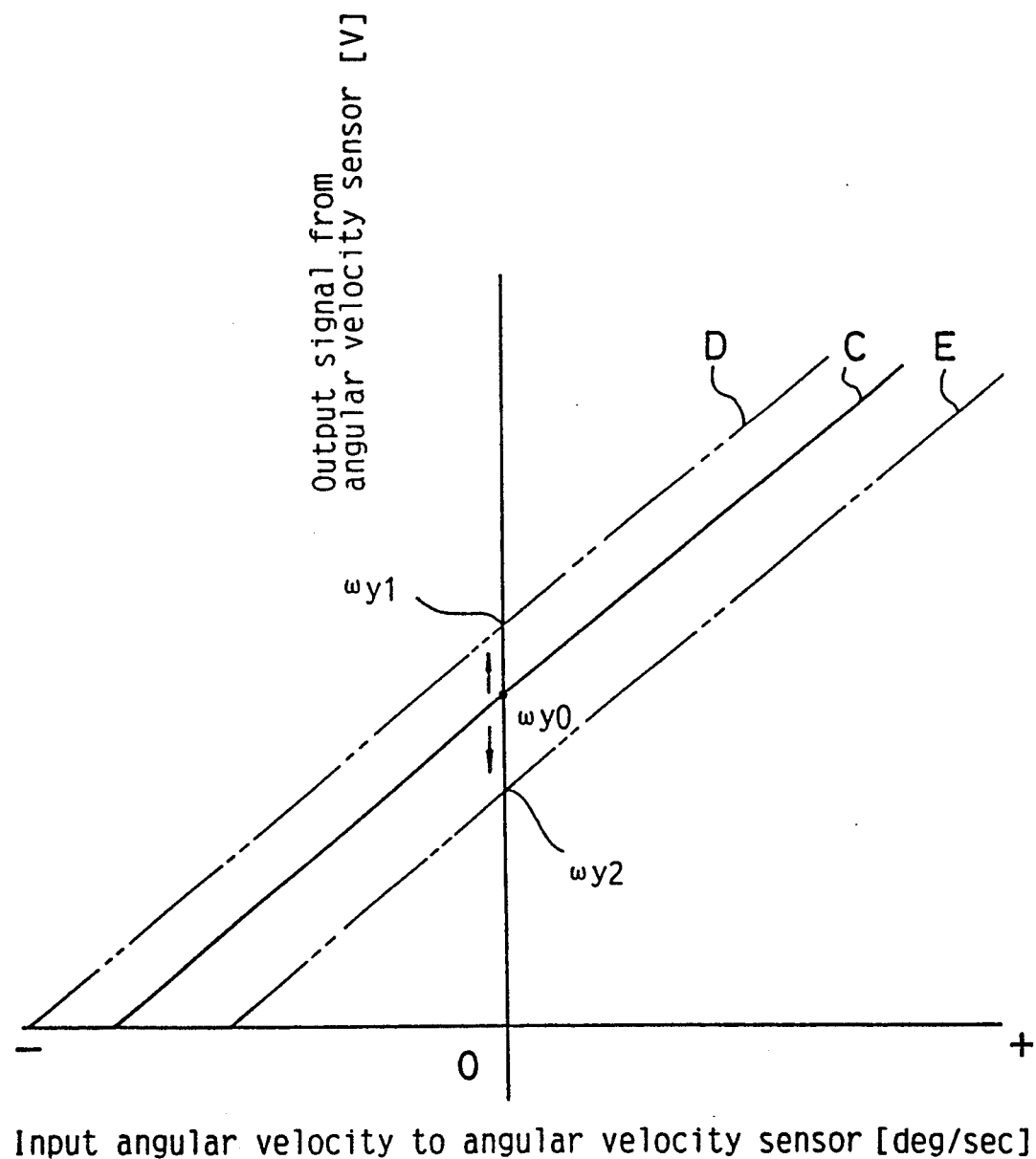
FIG. 18 is a characteristic diagram of the angular velocity sensor.

Hereafter, another four-wheel steering apparatus as a sixth embodiment of the vehicle control apparatus of the present invention is elucidated with reference to the accompanying drawings of FIGS. 16 and 17.

FIG. 16 shows a schematic diagram of the four-wheel steering apparatus as the sixth embodiment of the vehicle control apparatus. FIG. 17 shows a flowchart of operation of the sixth embodiment. Parts and components corresponding to the fourth embodiment are shown by the same reference numerals and marks, and the description thereof made in the fourth embodiment similarly apply. Differences and features of this sixth embodiment from the fourth embodiment are as follows.

As shown in FIG. 16, the four-wheel steering apparatus 54 receives detected signals V and $\omega y$ of the vehicle speed sensor 1 and the yaw angular velocity sensor 2. The four-wheel steering apparatus 54 comprises a zero-point calculation means 56, an angular velocity correction means 57, a rear-wheels target-angle decision means 38 and a rear-wheels steer-angle decision means 39. The vehicle 11 having the above-mentioned four-wheel steering apparatus 54 comprises: a front-wheels steering unit 31 for controlling a steering angle of front wheels 40 in response to the operation of a steering wheel 33; a rear-wheels steering unit 35 for controlling a steering angle of rear wheels 41; and a steering-wheel angle sensor 32 for detecting the steering angle of the steering wheel 33. The vehicle 11 provides a rear-wheels steer-angle sensor 20 for detecting rear wheels 41 in response to a rear-wheels steer-angle command-signal Sr which is issued by the rear-wheels steer-angle decision means 39. The zero-point calculation means 56 comprises a low-pass digital filter similar to the aforementioned zero-point calculation means 26 in the third embodiment. The zero-point calculation means 56 eliminates undesirable output signals for detecting change of the zero-point signal $\omega y0$ of the yaw angular velocity sensor 2. The undesirable output signals of the yaw angular velocity sensor 2 are generated owing to the rolling and the vibrating of the vehicle 11. The zero-point calculation means 56 detects the drifted zero-point signal ωy0 owing to the secular change and/or the temperature change, etc. The angular velocity correction means 57 corrects the detected output signal ωy of the yaw angular velocity sensor 2, and calculates a corrected value ωyA of the yaw angular velocity sensor 2. The rear-wheels target-angle decision means 38 decides a target steer angle of the rear wheels 41 in response to the calculated corrected value ωyA, the steering-wheel angle-signal TH detected by the steering-wheel angle sensor 32 and the detected signal V of the vehicle speed sensor 1. The rear-wheels steer-angle decision means 39 issues the rear-wheels steer-angle command-signal Sr for controlling the steering angle of the rear wheels 41. The steering angle of the rear wheels 41 is detected by the rear-wheel steer-angle sensor 20 which issues feedback signals to the four-wheel steering apparatus 54.

FIG. 17 shows a flowchart of the four-wheel steering apparatus 54 in accordance with the present invention.

In step 1401 of FIG. 17, the output signal TH of the steering-wheel angle sensor 32, the output signal V of the vehicle speed sensor 1 and output signal ωy of the yaw angular velocity sensor 2 are detected. Next, in step 1402, the undesirable output signals of the yaw angular velocity sensor 2 owing to the rolling and the vibrating of the vehicle 11 are eliminated by the zero-point calculation means 56 which comprises the low-pass digital filter. The change of the zero-point signal ωy0 is detected by calculating the aforementioned formula (9) shown in the third embodiment. The zero-point signal ωy0 which is calculated by the zero-point calculation means 56 is stored as a new zero-point signal ωy0 for correction.

In step 1403, the angular velocity correction means 57 corrects the detected output signal ωy of the yaw angular velocity sensor 2 to the corrected value ωyA by calculating the aforementioned formula (5) shown in the first embodiment.

In step 1404, the rear-wheels target-angle decision means 38 decides the target steer angle of the rear wheels 41 in response to the corrected value ωyA of the yaw angular velocity, the steering-wheel angle-signal TH detected by the steering-wheel angle sensor 32, and the detected signal V of the vehicle speed sensor 1. In step 1405, the rear-wheels steer-angle decision means 39 outputs the rear-wheels steer-angle command-signal Sr to the rear-wheels steering unit 35. The rear-wheels steering unit 35 steers the rear wheels 41 in response to the rear-wheels steer-angle command-signal Sr in step 1406.

Thus, according to the sixth embodiment of the present invention, the four-wheel steering apparatus can correctly compensate for the error of the yaw angular velocity sensor 2 which receives the secular change and the temperature change, etc.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications that fall within the true spirit and scope of the invention.

What is claimed is:

1. A vehicle control apparatus comprising:
   a vehicle speed sensor for detecting speed of a vehicle;
   at least one angular velocity sensor for detecting angular velocity about a pitch axis, a yaw axis or a roll axis of said vehicle;
   a zero-point calculation means which detects a normal state of said vehicle by using output signals of said vehicle speed sensor and output signals of said angular velocity sensor, and which calculates an average of said output signals of said angular velocity sensor in said normal state, said average of said output signals of said angular velocity sensor corresponding to a zero-point signal;
   an angular velocity correction means which corrects said output signal of said angular velocity sensor by using said zero-point signal calculated by said zero-point calculation means;
   a turning state inference means which infers a rolling state of said vehicle from said corrected signal output from said angular velocity correction means and an output signal of said vehicle speed sensor, and further produces output signals for controlling said rolling state of said vehicle; and
   shock absorber means whereof a damping force is adjusted in response to said output signals from said turning state inference means.

2. A vehicle control apparatus in accordance with claim 1, wherein
   said zero-point calculation means which comprises a low-pass filter having a predetermined cut-off frequency eliminates signals which is output by said angular velocity sensor owing to the rolling and the vibrating of said vehicle; and
   said angular velocity correction means corrects output signal of said angular velocity sensor during driving.

3. A vehicle control apparatus in accordance with claim 1, wherein
   said zero-point calculation means calculates a zero-point signal of said angular velocity sensor when a change rate of the detected angular velocity is on or below a predetermined change rate.

4. A vehicle control apparatus in accordance with claim 1, wherein
   said zero-point calculation means which infers a drift value and a zero-point signal from a change rate of the detected angular velocity; and
   said angular velocity correction means corrects output signal of said angular velocity sensor regardless of driving.

5. A vehicle control apparatus comprising:
   a vehicle speed sensor for detecting speed of a vehicle;
   a steering wheel angle sensor for detecting steering angle of a steering wheel of said vehicle;
   an angular velocity sensor for detecting angular velocity about a yaw axis of said vehicle;
   a rear wheel steering unit for steering rear wheels; and
   a four-wheel steering unit which comprises:
   (a) a zero-point calculation means which detects a normal state of said vehicle by using output signals of said vehicle speed sensor and output signals of said angular velocity sensor, and which calculates an average of said output signals of said angular velocity sensor in said normal state, said calculated average corresponding to a zero-point signal;

(b) an angular velocity correction means which corrects said output signal of said angular velocity sensor by said zero-point signal calculated by said zero-point calculation means; and (c) a rear wheel decision means for deciding a target steer angle of said rear wheels in response to corrected value corrected by said angular velocity correction means, output signals of said vehicle speed sensor and output signals of said steering wheel angle sensor.

6. A vehicle control apparatus in accordance with claim 5, wherein said zero-point calculation means which infers a drift value and a zero-point signal from a change rate of the detected angular velocity; and said angular velocity correction means corrects output signal of said angular velocity sensor regardless of driving.

7. A vehicle control apparatus in accordance with claim 5, wherein said zero-point calculation means which comprises a low-pass filter having a predetermined cut-off frequency eliminates signals which is output by said angular velocity sensor owing to the rolling and the vibrating of said vehicle; and said angular velocity correction means corrects output signal of said angular velocity sensor during driving.

8. A vehicle control apparatus in accordance with claim 5, wherein said zero-point calculation means calculates a zero-point signal of said angular velocity sensor when an output signal of said steering wheel angle sensor is on or below a predetermined value, and when a change rate of the detected angular velocity is on or below a predetermined change rate.

* * * * *